(12) United States Patent
Brown et al.

(10) Patent No.: US 7,262,765 B2
(45) Date of Patent: Aug. 28, 2007

(54) APPARATUSES AND METHODS FOR UTILIZING NON-IDEAL LIGHT SOURCES

(75) Inventors: Margaret Brown, Seattle, WA (US); Voytek Andron, North Bend, WA (US); David Skurnik, Kirkland, WA (US); Eric Altendorf, Edmonds, WA (US); Martin Kykta, Woodinville, WA (US); Mark A. Holton, Everett, WA (US); Clarence T. Tegreene, Bellevue, WA (US); Christopher A. Wiklof, Everett, WA (US)

(73) Assignee: Microvision, Inc., Redmond, WA (US)

( * ) Notice: Subject to any disclaimer, the term of this patent is extended or adjusted under 35 U.S.C. 154(b) by 393 days.

(21) Appl. No.: 10/933,003

(22) Filed: Sep. 2, 2004

(65) Prior Publication Data

US 2005/0030305 A1    Feb. 10, 2005

Related U.S. Application Data

(63) Continuation-in-part of application No. 10/687,414, filed on Oct. 14, 2003, now Pat. No. 7,071,931, which is a continuation of application No. 10/216,449, filed on Aug. 9, 2002, now Pat. No. 6,661,393, which is a continuation of application No. 09/369,673, filed on Aug. 5, 1999, now Pat. No. 6,445,362.

(51) Int. Cl.
*G09G 3/36* (2006.01)

(52) U.S. Cl. ................... 345/207; 345/63; 345/89; 345/204; 345/690; 359/204; 359/292

(58) Field of Classification Search ................. 345/63, 345/89, 204, 205, 207, 690; 347/251; 348/607; 359/204, 292
See application file for complete search history.

(56) References Cited

U.S. PATENT DOCUMENTS

| | | | | | |
|---|---|---|---|---|---|
| 3,211,898 | A | * | 10/1965 | Fomenko | 708/816 |
| 3,501,587 | A | * | 3/1970 | Herriott | 348/14.01 |
| 3,937,959 | A | * | 2/1976 | Namae | 250/310 |
| 5,162,899 | A | * | 11/1992 | Naka et al. | 358/518 |
| 5,278,641 | A | * | 1/1994 | Sekizawa et al. | 358/527 |
| 5,477,317 | A | * | 12/1995 | Edmunds et al. | 399/39 |
| 5,502,490 | A | * | 3/1996 | Takanashi et al. | 358/296 |

(Continued)

*Primary Examiner*—Bipin Shalwala
*Assistant Examiner*—Vincent E. Kovalick
(74) *Attorney, Agent, or Firm*—Dorsey & Whitney LLP

(57) ABSTRACT

A method includes obtaining a measurement of a property of a light source, scanning light from the light source onto a surface, such that the light interacts with the surface, detecting light from the surface to create a picture element, and correcting the picture element with the measurement of the property. An apparatus includes a scanned beam display, the scanned beam display is configured to receive a signal and to scan the signal for viewing by a user. The signal is to contain picture element information. The picture element information includes information for a plurality of colors, wherein information for at least one color is corrected to substantially remove a perturbation to the picture element information, such that an image containing the picture element information will be substantially unchanged by the perturbation.

68 Claims, 25 Drawing Sheets

U.S. PATENT DOCUMENTS

| | | | |
|---|---|---|---|
| 5,608,528 A * | 3/1997 | Ogawa | 356/620 |
| 5,825,402 A * | 10/1998 | Swartz | 347/251 |
| 5,877,494 A * | 3/1999 | Larsen et al. | 250/234 |
| 5,923,461 A * | 7/1999 | Allen et al. | 359/305 |
| 5,936,767 A * | 8/1999 | Favalora | 359/462 |
| 5,943,086 A * | 8/1999 | Watabe et al. | 347/235 |
| 5,977,942 A * | 11/1999 | Walker et al. | 345/97 |
| 5,999,237 A * | 12/1999 | Miyawaki | 349/57 |
| 6,008,833 A * | 12/1999 | Ohtsubo et al. | 347/237 |
| 6,297,791 B1 * | 10/2001 | Naito et al. | 345/89 |
| 6,753,914 B1 * | 6/2004 | Frost | 348/246 |
| 2004/0196443 A1 * | 10/2004 | Tomita et al. | 353/94 |

\* cited by examiner

APPARATUSES AND METHODS FOR UTILIZING NON-IDEAL LIGHT SOURCES

RELATED APPLICATIONS

This application is a continuation-in-part of, commonly assigned U.S. patent application Ser. No. 10/687,414, filed on Oct. 14, 2003 now U.S. Pat. No. 7,071,931, entitled "Image Capture Device with Projected Display," which is a continuation of U.S. application Ser. No. 10/216,449 filed Aug. 9, 2002, now U.S. Pat. No. 6,661,393, which is a continuation of U.S. application Ser. No. 09/369,673 filed Aug. 5, 1999, now U.S. Pat. No. 6,445,362.

U.S. patent application Ser. No. 10/687,414, filed on Oct. 14, 2003, entitled "Image Capture Device with Projected Display," and U.S. Pat. No. 6,661,393 are hereby incorporated by reference into the present application.

BACKGROUND OF THE INVENTION

1. Field of Invention

The invention relates generally to non-ideal light sources, and more specifically to methods and apparatuses for utilizing non-ideal light sources in scanned beam devices, such as displays and imaging devices.

2. Art Background

Light sources are used in devices used for image capture and in devices used to display an image to a user. Two parameters of a light source, used for such devices, are amplitude stability of the optical output as a function of time and the general stability of the dominant wavelength of the spectral distribution of optical energy. Fluctuations of either one or both of these parameters can cause a number of undesirable effects in either the image captured or the image displayed.

Several variations (non-idealities) of light source amplitude (optical intensity) are shown in FIG. 1, where amplitude 102 is plotted as a function of time 104. The preferred optical output is stable over time as indicated at 106. Many real light sources exhibit one or more of the non-idealities illustrated in FIG. 1 and FIG. 2.

Some examples of light sources used in the devices described above are a light emitting diode (LED), an edge emitting light emitting diode (EELED), a laser diode (LD), a diode pumped solid state (DPSS) laser, etc. One non-ideality these devices can exhibit is shot noise as shown at 114. Another non-ideality is a temporally periodic amplitude fluctuation 112. The amplitude can also decay with time as shown at 108 or increase with time as shown at 110. The amplitude non-idealities are not meant to be plotted on a common time scale 104 in FIG. 1, but are merely over plotted on the same time scale 104 for ease of discussion.

An optical output, spectral power density, (SPD) 202 of a light source is plotted a function of wavelength 204 in FIG. 2. Light sources such as InGaN-based blue and green edge emitting light emitting diodes (EELEDs), LDs, as well as other light sources, exhibit a drive level dependent output spectra. Such a drive level dependent output spectra causes a first spectrum with a dominant wavelength 206 to shift to a second spectrum with a dominant wavelength 208. This may cause various problems when such a light source is used in devices used to capture or display images.

For example, FIG. 3 shows a shifting color gamut, generally at 300, due to the effects described in conjunction with FIG. 2. With reference to FIG. 3, red, green, and blue (RGB) light source outputs 308, 310, and 312 are plotted in a Commission Internationale de l'Eclairage (CIE) color space with $y_c$ corresponding to 302 and $x_c$ corresponding to 304, and a region interior to curve 306 indicates the envelope of colors perceivable to the human eye. The triangle formed by connecting 308, 310, and 312 has a white point WP at 314. These RGB values can correspond to a particular light source drive level and 310 (FIG. 3) can correspond with dominant wavelength 206 (FIG. 2). At another drive level, the spectral output of the green source shifts to 210 (FIG. 2) causing a shift in the green dominant wavelength G plotted at 310 to a perturbed spectrum G' plotted at 316. In this example, the peak wavelength of the green source not only shifted, but the spectral purity of the source also shifted, as shown by the shorter, broader spectrum 210. Similarly, the blue light source can experience a shift in dominant wavelength from B to B' with drive level, resulting in a shift of CIE chromaticity from 312 to 318. Ignoring the relative values of green and blue spectra, the change in spectral output corresponds, for example, to a shift from curve 206 to 208 (FIG. 2). A new color gamut is formed by the triangle represented by 308, 316, and 318 (in this example the red light source is assumed to be unaffected by drive level changes). The white point WP' within the new color gamut corresponds to point 320, which represents a shift from the white point WP at 314. Such drive level dependant color gamut fluctuations are often undesirable.

It is generally desirable to use inexpensive light sources in order to reduce the cost of a display or an image capture device. However, inexpensive light sources may tend to exhibit the above described non-idealities to an unacceptable level. For example, an inexpensive DPSS laser can exhibit amplitude fluctuations of 30 percent. The amplitude noise on some DPSS lasers occurs in the 1-100 kilohertz band, which can coincide with the periodicity or other features of some image data, to make the image artifacts even more pronounced during either image capture or image display.

Polarization can also fluctuate and, owing to polarization sensitivities in some systems, can produce similar amplitude variations. Typically, such amplitude variations result from polarization dependent differences in system gain. Additionally, DPSS and similar sources may exhibit mode coupling, where the beating of a plurality of modes can produce amplitude noise.

While the tolerance of the eye to amplitude variations is image dependent and spatial frequency dependent, the human eye generally can detect two (2) to three (3) percent amplitude variations in small regions. Thus, amplitude variations in such light sources may produce perceivable image artifacts.

BRIEF DESCRIPTION OF THE DRAWINGS

The invention may best be understood by referring to the following description and accompanying drawings that are used to illustrate embodiments of the invention. The invention is illustrated by way of example in the embodiments and is not limited in the figures of the accompanying drawings, in which like references indicate similar elements.

DETAILED DESCRIPTION

In the following detailed description of embodiments of the invention, reference is made to the accompanying drawings in which like references indicate similar elements, and in which is shown by way of illustration, specific embodiments in which the invention may be practiced. These embodiments are described in sufficient detail to enable those of skill in the art to practice the invention. In other instances, well-known circuits, structures, and techniques have not been shown in detail in order not to obscure the understanding of this description. The following detailed description is, therefore, not to be taken in a limiting sense, and the scope of the invention is defined only by the appended claims.

Apparatuses and methods are disclosed that facilitate utilization of non-ideal light sources in devices and systems that capture and/or display image(s). In various embodiments, compensation for light source non-idealities such as amplitude noise, dominant wavelength fluctuations, light source color gamut correction, etc. are disclosed. In one or more embodiments, the non-idealities are known a priori. In one or more embodiments, the non-idealities are not known a priori. In one or more embodiments, combinations of non-idealities are present where certain non-idealities are known a priori while other non-idealities are not known a priori.

Figure 1:
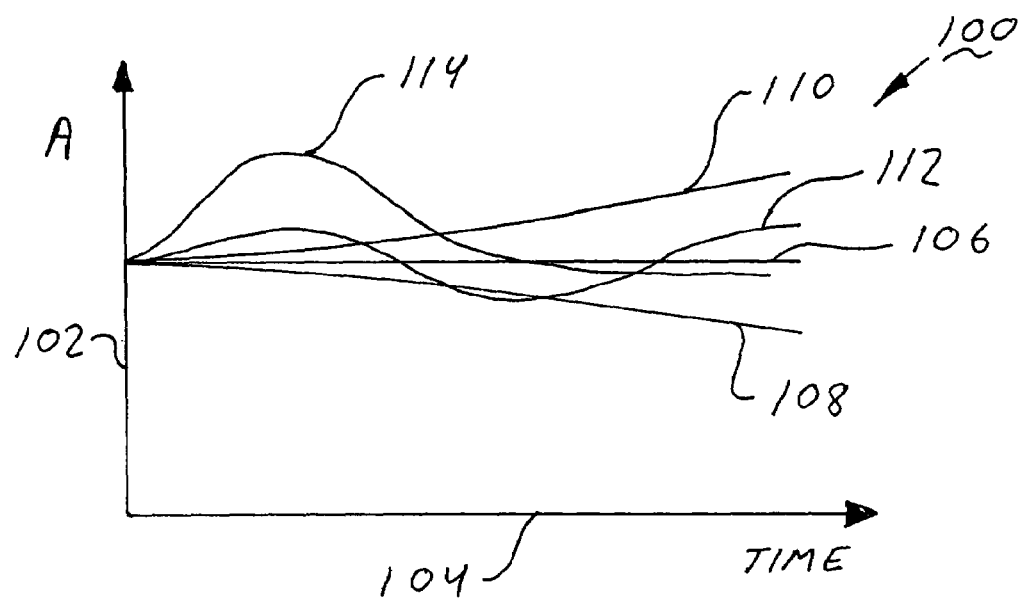
FIG. 1 depicts temporal variations of a light source output.
Figure 2:
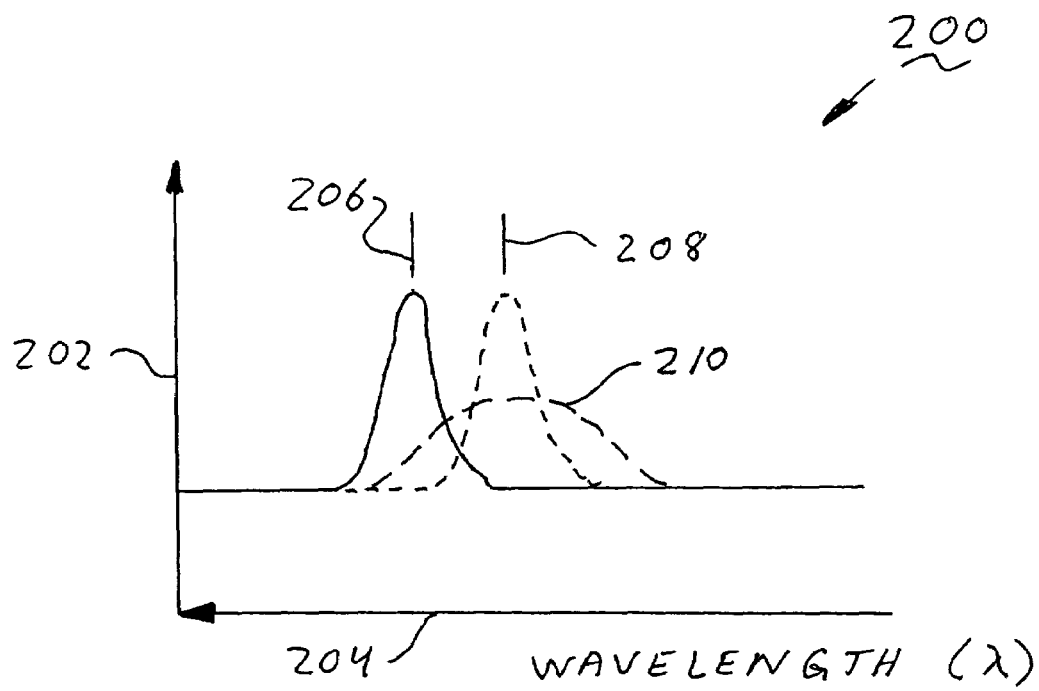
FIG. 2 depicts a shift in a dominant wavelength of a light source output.
Figure 3:
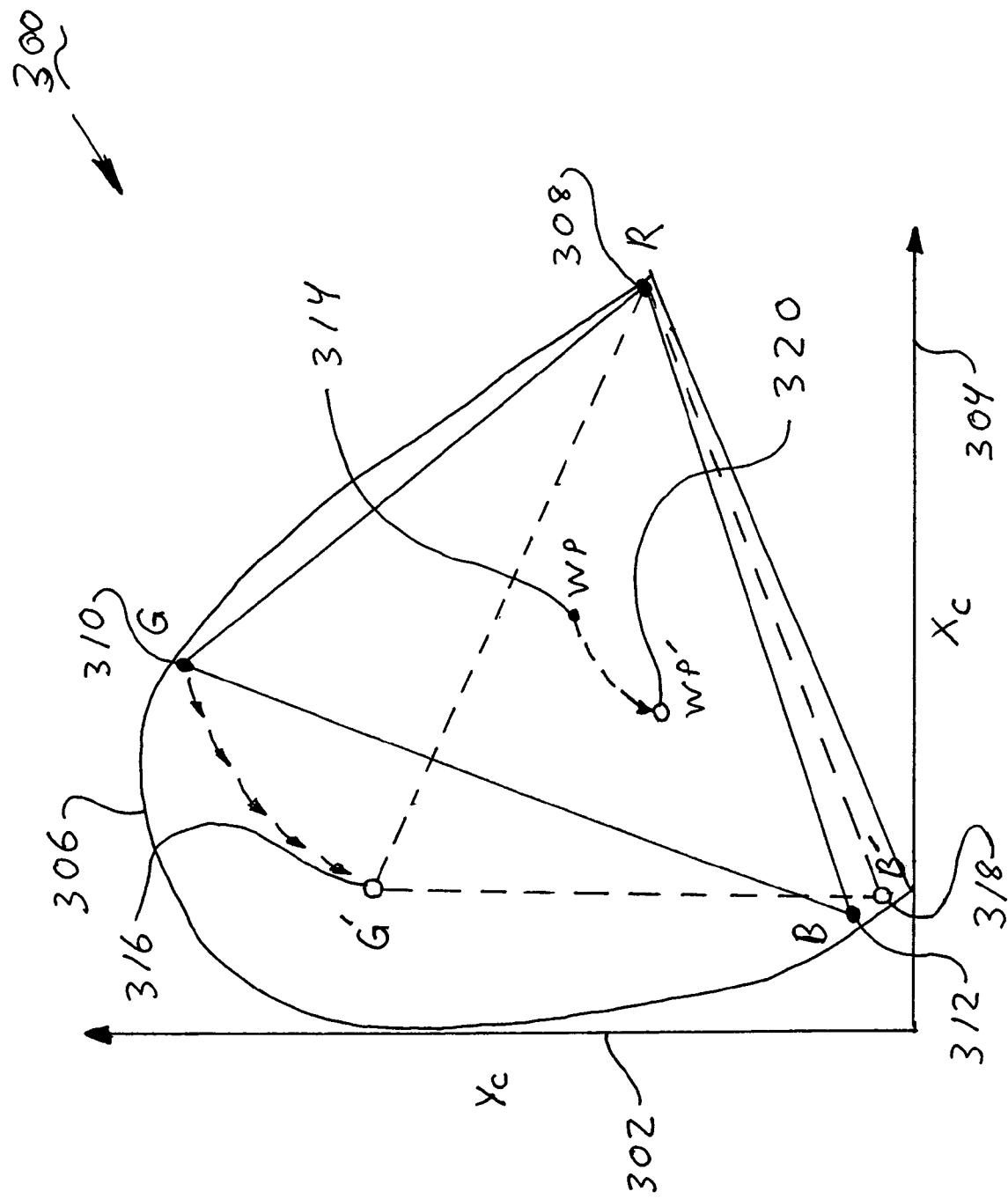
FIG. 3 shows a shifting color gamut due to the effects shown in FIG. 2.
Figure 4A:
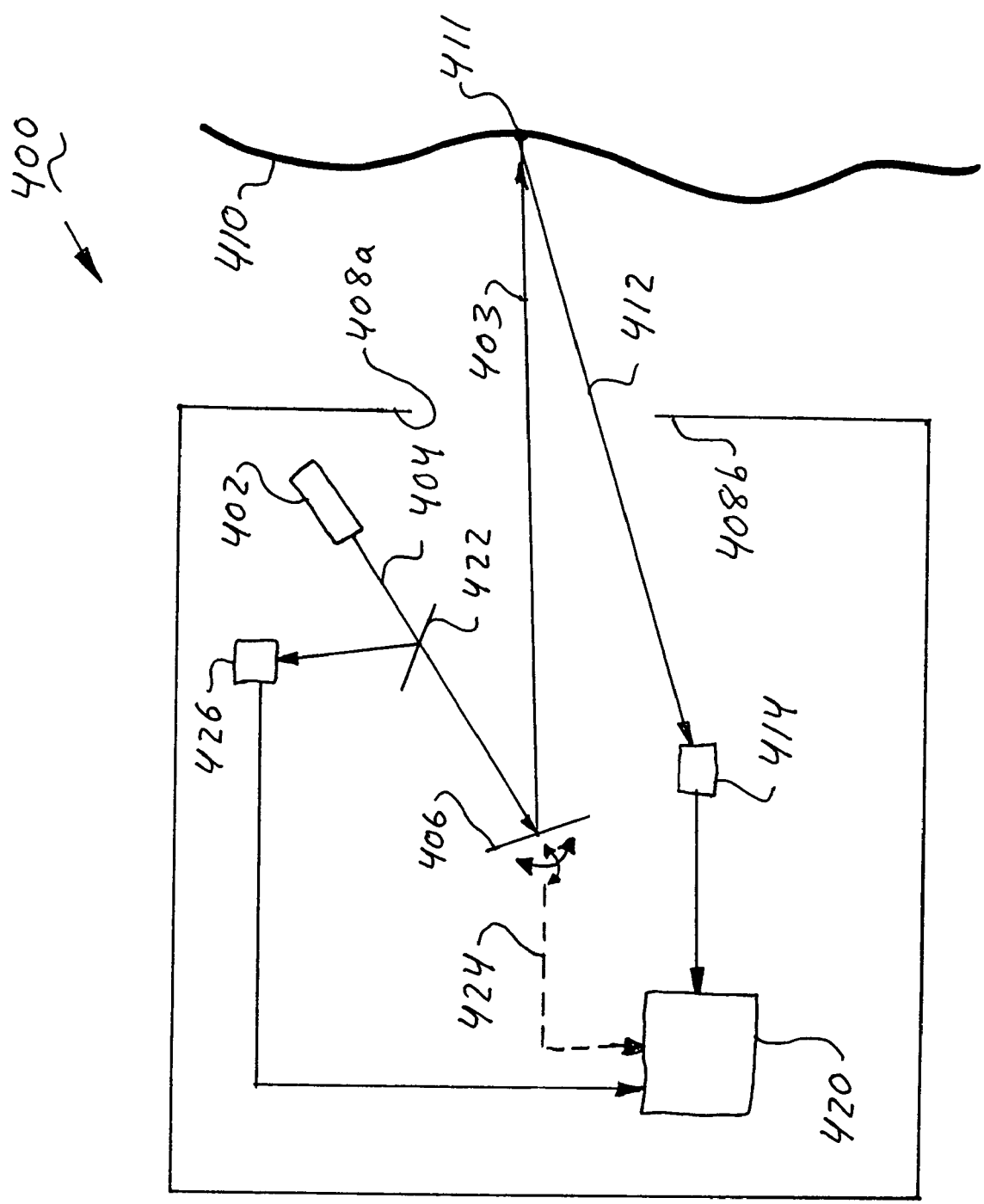
FIG. 4A illustrates amplitude correction according to one embodiment of the invention.

FIG. 4A illustrates amplitude correction according to one embodiment of the invention. A device capable of capturing an image is shown generally at 400. With reference to FIG. 4A, a light source 402, creates a first beam of light 404. A scanner 406, which includes a mirror, deflects the first beam of light 404 to produce a scanned beam 403, the scanned beam 403 passes through a transmissive window defined between surfaces 408a and 408b to illuminate a spot 411 on a surface 410. The scanner 406 will be described more fully below in conjunction with FIG. 4B. While the scanned beam 403 illuminates the spot 411 the scanned beam 403 is reflected, absorbed, scattered, refracted or otherwise affected by the properties of the surface 410 at spot 411 to produce scattered light energy 412 from the spot 411. A portion of the scattered light energy 412 is received by one or more detectors 414 and is typically converted into an electrical signal that may be analog or digital. In various embodiments, the detector 414 is a photodetector. In other embodiments, the detector 414 senses a parameter related to the scattered light energy such as current flow, etc. The output of the detector 414 is received at block 420. Optionally, a position of the scanner, corresponding to the location of spot 411, is communicated at 424 to block 420. A measure of the intensity of the light source, obtained before the light source is scattered by the surface 410, is obtained, in one embodiment, with a device 422. In one embodiment, the device 422 is a partially transmissive mirror. The device 422 diverts a portion of the first beam of light 404 to a detector 426. The output of the detector 426 is received at block 420. In one embodiment, the scattered light energy 412 is normalized by the intensity of the light source obtained before the light beam is scattered by the surface 410 to produce a corrected scattered-light-energy value corresponding to the light energy scattered from the spot 411. The process is repeated for each spot on the surface 410 corresponding to the collection of spots that compose the image of the surface 410. Correction of the scattered light energy 412 accounts for various non-idealities of the light source 402, such as a time varying light source intensity. In various embodiments, the correction can be applied to a picture element (pixel), a group of pixels, a line of an image, a frame of an image, etc.

According to various embodiments, the image capture device 400 can be used in a variety of applications, such as but not limited to, a digital camera, a bar code reader, multidimensional symbol reader, document scanner, scanning endoscope, confocal microscope, confocal microprobe, or other image capture or acquisition device. To allow the device to gather light efficiently, the device 400 can include gathering optics (not shown) that collect and transmit light from the surface 410 to the device 400. The gathering optics are configured to have a depth of field, focal length, field of view (FOV), and other optical characteristics appropriate for the particular application. For example, in one embodiment, where the device 400 is a two-dimensional symbology reader, the gathering optics may be optimized for red or infrared light and the focal length may be on the order of 10-50 centimeters. For reading symbols at a greater distance, the focusing optics may have a longer focusing distance or may have a variable focus. The optics may be positioned at various locations along the optical path to allow smaller, cheaper components to be used.

While in many instances, non-imaging gathering optics are used, other applications may make use of a photodetector comprised of a number of pixel elements such as a charge-coupled device (CCD) or a complimentary metal oxide semiconductor (CMOS) focal plane imager. In such cases, the gathering optics are configured to provide an image of the surface 410, the scanning beam being used as primary or auxiliary illumination or excitation.

Figure 4B:
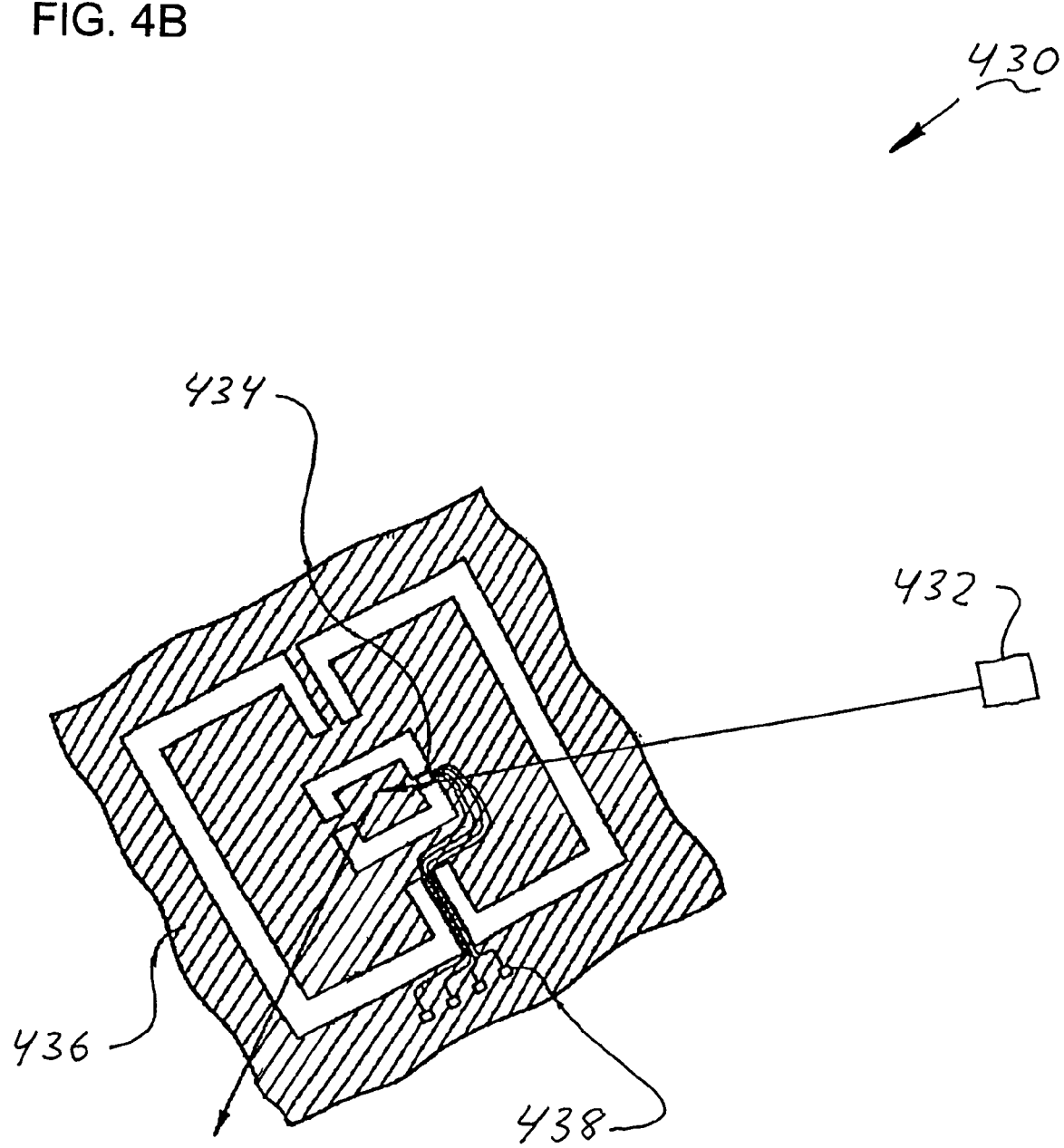
FIG. 4B depicts a scanner according to one embodiment of the invention.

FIG. 4B depicts a scanner according to one embodiment of the invention, illustrated generally at 430. With reference to FIG. 4B, a biaxial scanner 436 is a single mirror device that oscillates about two orthogonal axes. Design, fabrication and operation of such scanners are described for example in U.S. Pat. No. 5,629,790 to Neukermans et al. entitled MICROMACHINED TORSIONAL SCANNER, in Asada, et al, Silicon Micromachined Two-Dimensional Galvano Optical Scanner, IEEE Transactions on Magnetics, Vol. 30, No. 6, 4647-4649, November 1994, and in Kiang et al, Micromachined Microscanners for Optical Scanning, SPIE proceedings on Miniaturized Systems with Micro-Optics and Micromachines II, Vol. 3008, February 1997, pp. 82-90 each of which is incorporated herein by reference. The biaxial scanner 436 includes integral sensors 434 that provide electrical feedback of the mirror position to terminals 438, as is described in U.S. Pat. No. 5,648,618 to Neukermans et al. entitled MICROMACHINED HINGE HAVING AN INTEGRAL TORSIONAL SENSOR, which is incorporated herein by reference. Torsional movement of a microelectromechanical (MEMs) scanner can produce electrical outputs corresponding to the position of the scanner/mirror 406 (FIG. 4A). Light from the light source 432 strikes the biaxial scanner 436 and is scanned horizontally and vertically to approximate a raster pattern across a surface to be imaged, such as the surface 410 (FIG. 4A). Electrical outputs, corresponding to the position of the scanner 436, are communicated optionally at 424 (as described above in conjunction with FIG. 4A) to provide the position of the spot 411 within the collection of spots used to compose the image of the surface 410.

Alternatively, the position of the scanner/mirror may be obtained by mounting piezoelectric sensors to the scanner, as described in U.S. Pat. No. 5,694,237 to Melville, entitled POSITION DETECTION OF MECHANICAL RESONANT SCANNER MIRROR, which is incorporated herein by reference. In other alternatives, a position of the optical beam can be determined by an optical detector that monitors the scanned beam as the beam passes through a field of view (FOV). Alternatively, a line within an image or successive lines within an image can be analyzed mathematically to obtain information corresponding to picture elements (pixels) without needing the scanner mirror position sensors described above.

In one embodiment, a biaxial MEMs scanner 436 scans one or more beams of light across a two-dimensional FOV or a selected region within a FOV to capture a frame of an image. A typical frame rate is 60 Hz. In one embodiment, both scanner axes can be operated resonantly. In another embodiment, one axis is operated resonantly, while the other axis is operated non-resonantly in an approximation of a saw tooth pattern; thereby creating a progressive scan pattern. In one embodiment, a progressively scanned bidirectional scanner, scanning a single beam is scanned at a frequency of 19 kilohertz in the horizontal and is scanned vertically in a sawtooth pattern at 60 Hz; thereby, approximating Super Video Graphics Array (SVGA) graphics resolution. In one embodiment of such a system, the horizontal scanner is driven electrostatically and the vertical scan motion is driven magnetically. Alternatively, both the horizontal scan motion and the vertical scan motion may be driven magnetically or capacitively. In various embodiments, both axes of the scanner may be driven sinusoidally or resonantly.

With reference back to FIG. 4A, light source 402 can represent a single light source or a plurality of light sources. Various devices can be used for light source 402, such as but not limited to, a light emitting diode (LED), an edge emitting light emitting diode (EELED), a diode-pumped solid state (DPSS) laser, a laser diode, a laser, a thermal source, an arc source, a fluorescent source, a gas discharge source, or other types of light sources. In one embodiment, the light source 402 is a red laser diode, which has a wavelength of approximately 635 to 670 nanometers (nm). In another embodiment, the light source 402 includes a red laser diode, a green DPSS laser, and a blue DPSS laser at approximately 635 nm, 532 nm, and 473 nm respectively. Many laser diodes can be modulated directly; however, DPSS lasers often require external modulation, such as with an acoustic-optic modulator (AOM) for example. In the case where an external modulator is used, it is considered to be part of the light source 402.

The light source 402 may include, beam combining optics (not shown) to combine some or all of the light beams into a single beam. The light source 402 may also include beam-shaping optics (not shown) such as one or more collimating lenses and/or apertures. Additionally, while the wavelengths described in the previous embodiments have been in the optically visible range, other wavelengths are within the scope of embodiments of the invention.

As described above, multiple light sources can be used for the light source 402. The first beam of light 404 can include a plurality of beams of light converging on a single scanner 406 or onto separate scanners 406.

Different types of detectors can be used for the detector 414. In one embodiment, the detector 414 is a positive-intrinsic-negative (PIN) photodiode. In the case of multi-colored imaging, the detector 414 can include splitting and filtering functions to separate the scattered light into component parts before detection. Other detectors can be used, such as but not limited to, an avalanche photodiode, (APD) or a photomultiplier tube (PMT). In some embodiments, the detector 414 collects light through filters (not shown) to reduce ambient light. According to various embodiments, the detector(s) can be arranged to stare at the entire field of view (FOV), a portion of the FOV, collect light retrocollectively, or collect light confocally.

Alternatively, non-optical detection may be used for monitoring variations in light source output. For example, some variations in light output may accompany or arise from changes in light source electrical characteristics. An increase in light emitter or circuit resistance, for example, may result in decreased current dissipation; which in turn may result in decreased light output. In such an exemplary case, light output variations may be correlated with electrical changes. Thus, an electrical detector may be effectively used to monitor light output. As illustrated by this example, the term "detector" may be used to encompass a range of technologies which detect a characteristic that is correlated to light output.

In various embodiments, the device 400 can be implemented to produce a monochrome or color image(s). The term "grayscale" will be understood to refer to embodiments of each within the scope of the teaching herein. Color images can be created utilizing a set of system primaries, such as with nominally red, blue, and green (RGB) light sources or with various other combinations of light sources. The system primaries need not be constrained to the RGB triad.

As described above, a measure of the intensity of the light source 402 is obtained before the scanned beam of light 403 interacts with the surface 410. Accordingly, the measure of the intensity can be picked-off at any location along the optical path before the scanned beam of light 403 interacts with the surface 410. In one or more embodiments, the detector can be a detector similar to the description of detector 414.

Figure 4C:
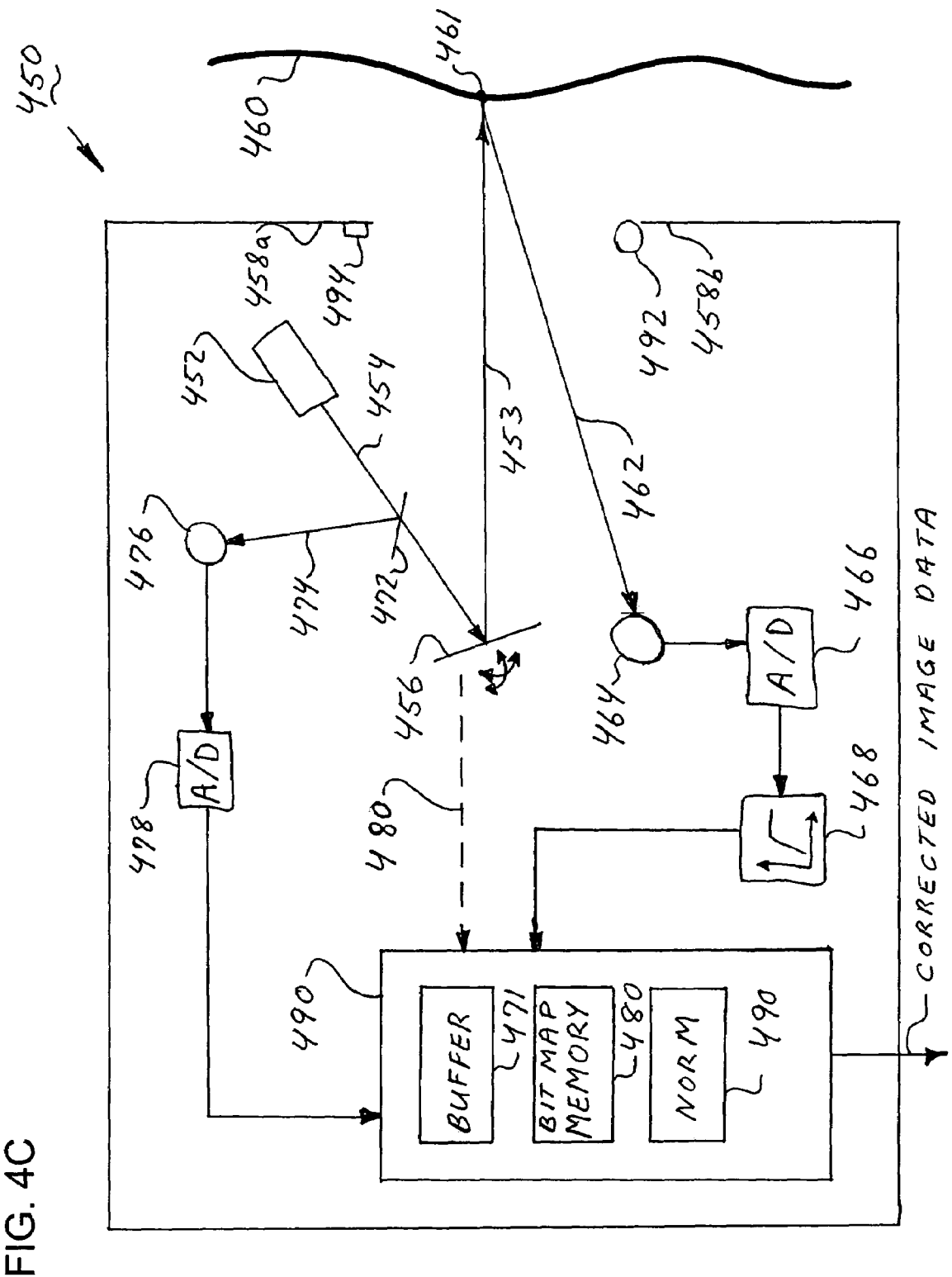
FIG. 4C illustrates amplitude correction according to another embodiment of the invention.

FIG. 4C illustrates amplitude correction according to another embodiment of the invention, illustrated generally at 450. With reference to FIG. 4C, a light source 452, creates a beam of light 454. A scanner 456, which includes a mirror, deflects the beam of light 454 to produce a scanned beam 453, the scanned beam 453 passes through an aperture defined by surfaces 458a and 458b to illuminate a spot 461 on a surface 460. The scanner 456 can be a bidirectional scanner such as the scanner described above in conjunction with FIG. 4B or the scanner 456 can include more than one scanner to scan a beam in a raster pattern across the surface 460. As described above in conjunction with FIG. 4A, the scanned beam is scattered from a spot 461 on the surface 460 to produce scattered light energy 462.

The scattered light energy 462 is received by one or more detectors 464 and is converted into a digital signal at analog to digital (A/D) converter 466. Appropriate filtering can be applied to the signal either digitally after conversion by the A/D converter 466 or the analog signal can be filtered before A/D conversion. In one embodiment, filtering can remove the undesirable effects of 60 cycle power-line related noise existing in the environment. Filtering can be added to the system. According to various embodiments, to improve the effective signal to noise ratio (S/N). Care is taken to avoid eliminating the signal of interest (the picture element information), degrading resolution or system sensitivity. Output from filter 468 is communicated to block 490 and can be stored in a buffer 471.

The scanner mirror position can be obtained from sensors incorporated into the scanner as described above in conjunction with FIG. 4B or other methods of determining the position of the scanner can be employed. Optionally, a position of the scanner, which corresponds to the spot 461, is communicated at 480 to block 490 and can be stored in the buffer 471.

A measure of the intensity of the light source 452 is obtained, in one embodiment, with a device 472 and a detector 476. In one embodiment, the device 472 is a partially transmissive mirror. The device 472 diverts a portion 474 of the first beam of light 454 to the detector 476. The detector 476 can be a PIN photodiode, avalanche photodiode (APD), a photomultiplier tube (PMT), etc. In one embodiment, the output of the detector 476 is converted to a digital signal at A/D converter 478. The digital signal output from the A/D converter 478 is communicated to block 490 and can be stored in the buffer 471.

In one embodiment, the values in the buffer 471 corresponding to the scattered light energy from spot 461, the position of the scanner corresponding to spot 461 within the image, and the intensity of the light source are stored in memory 480. In one embodiment, a divide function is applied to the data whereby the scattered light energy 462 is normalized by the intensity of the light source obtained before the light beam is scattered by the surface 460 to produce a corrected scattered-light-energy value corresponding to the light energy scattered from the spot 461. The process is repeated for each spot on the surface 460 corresponding to the collection of spots that compose the image being acquired. Correction of the scattered light energy 462 accounts for various non-idealities of the light source 452, such as a time varying light source intensity. In various embodiments, the correction can be applied to a picture element (pixel), a group of pixels, a line of an image, a frame of an image, etc. The present invention is not limited by the discretization applied to the image.

An alternative embodiment to picking off a portion of the beam of light 474 with device 472 and detector 476 is to place a reflector 494 (with a known index of reflectance) such that the scanned beam 453 reflects off of reflector 494 and is detected by the detector 464. Often, the reflector 494 will be positioned outside of the field of view (FOV), though in some embodiments, the reflector may be within the FOV.

The configuration with the reflector 494 allows for a normalization of the image on a per line basis if the reflector 494 allowed the scanned beam to be reflected as each line composing the image was scanned. Alternatively, an amount of the image acquired either before or after an intensity of the light beam is measured via reflector(s) 494 can be normalized at 490 by the measurement(s) of intensity. For example, if four reflectors 494 are placed at intervals along a dimension of the (FOV), four measurements of the intensity can be made in the overscan region corresponding to the location of the reflectors 494. The measurements of the intensity can be used to correct the scattered light energy collected from the surface 460. It will be recognized by those of skill in the art that the reflector(s) 494 can be positioned anywhere outside of the FOV, placement is not limited to the position shown within FIG. 4C. Alternatively, a light transmissive window defined between surfaces 458a and 458b may be made partially reflective and a portion of the beam energy may be picked-off substantially continuously from the partially reflective surface. AC-coupling of the scanned surface 460 may be used to separate the substantially DC picked-off signal corresponding to light source characteristics, or alternatively the picked-off light may be directed to a separate detector.

Another alternative embodiment that eliminates device 472 from the system of 450 moves the detector 476 to location 492. Location 492 is any location outside of the FOV being scanned. As the scanned beam 453 moves over the detector placed at location 492 a measure of the intensity of the beam is obtained before the beam is scattered by the surface 460.

Any number of detectors 492 can be placed around the perimeter of the aperture formed by surfaces 458a and 458b or outside of the FOV. Detectors can be placed such that a measurement of the intensity of the scanned beam can be made with each line scanned or a detector can be placed that allows one measurement of the intensity to be made with each complete scan of the surface 460 (e.g., once per frame of image data).

Figure 5:
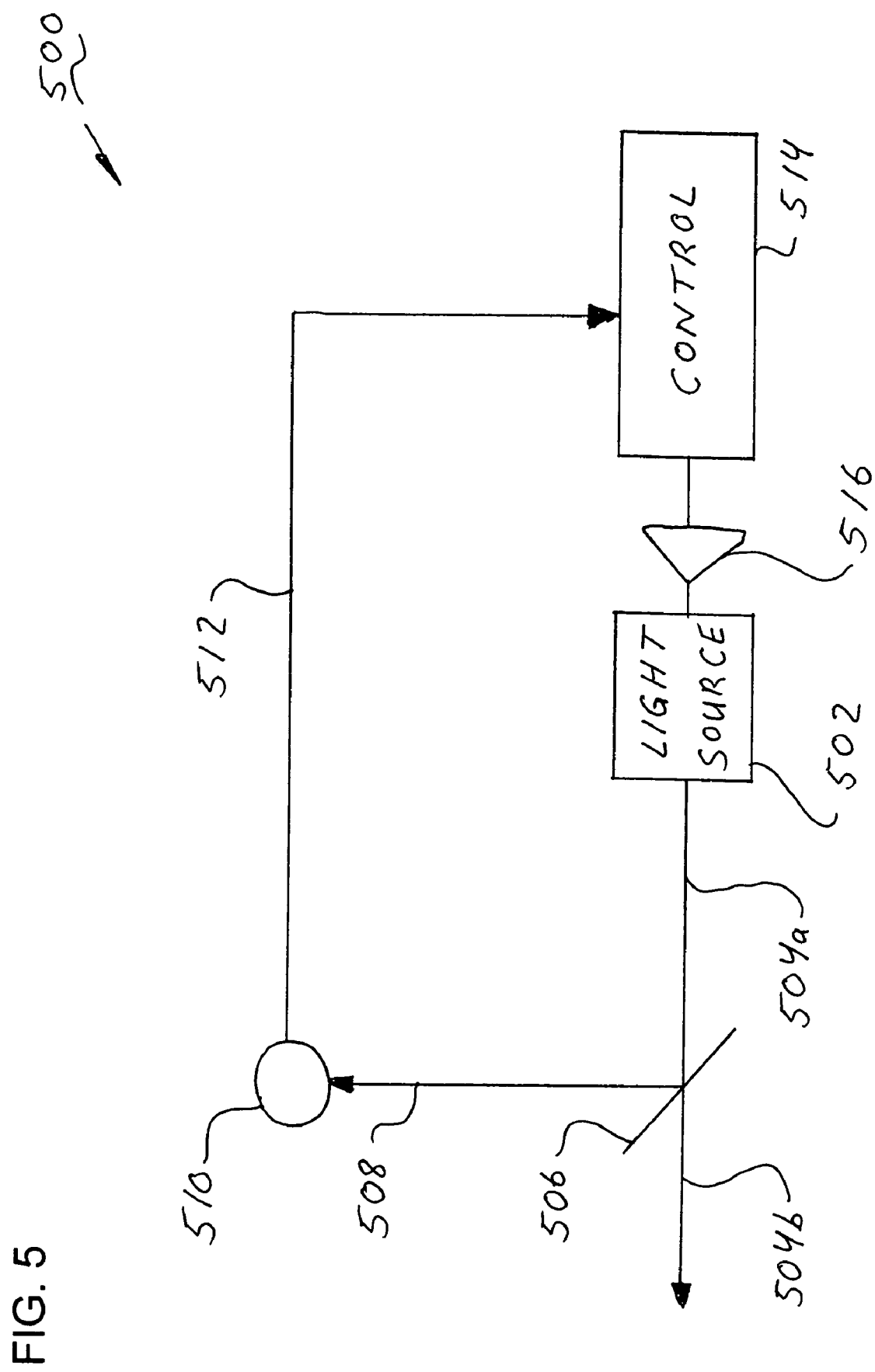
FIG. 5 illustrates amplitude correction utilizing feedback to a light source drive according to one embodiment of the invention.

FIG. 5 illustrates amplitude correction utilizing feedback to a light source drive according to one embodiment of the invention. With reference to FIG. 5, a feedback system is illustrated generally at 500. A light source 502 has an optical output 504a. The non-idealities, described above with respect to temporal amplitude fluctuations in the optical intensity of a light source can be present in the output 504a of the light source 502. In various embodiments, any of the light sources described above can be utilized for light source 502. In one embodiment, the light source is a DPSS laser. Amplitude fluctuations of up to 30 percent can occur when a DPSS laser is used as a light source.

A device 506 is used to divert a known portion 508 of the incident optical beam 504a to detector 510. In one embodiment, the device 506 is a partially reflecting mirror. The detector 510 can be any one of a number of photoelectric devices that convert an optical signal into an electrical signal. Such devices include, but are not limited to a PIN photodiode an avalanche photodiode (APD) and a photomultiplier tube (PMT). The electrical signal 512 is fed back to a compensation and control stage 514. According to one embodiment, compensation and control stage 514 adjusts the light source drive level to maintain a uniform light source output 504a by minimizing the diverted portion 508. In one embodiment, the input signal used to drive amplifier 516 is adjusted by the compensation and control stage 514. In one embodiment, the amplifier 516 is the light source drive amplifier. In another embodiment, the light source is driven with a periodic waveform having a frequency equal to or greater than pixel frequency, and light source compensation is realized by modulating the duty cycle of the waveform. Other methods of controlling the amplitude of the optical output of the light source based on the diverted reference signal 508 and the compensation and control stage 514 will be apparent to those of skill in the art based on the teachings presented herein; embodiments of the present invention are not limited thereby.

Compensation and control stage 514 continuously adjusts the light source drive level to maintain a uniform optical output 504b, which is used in a scanned beam image capture device such as those illustrated within FIG. 4A and FIG. 4C. The non-idealities in the amplitude of the optical output (amplitude noise) are substantially reduced by the feedback system 500. Such a feedback system 500 can be used, in various embodiments, in place of the correction methods and apparatuses described in FIG. 4A and FIG. 4C or in addition to the correction methods and circuits described in those figures.

A non-ideality exhibited by some diode based light sources, such as light emitting diodes (LEDs), is an optical output that drifts with time. This characteristic is an undesirable non-ideality of the light source and can arise due to thermal drift, etc. In one or more embodiments, a self-calibration of the light source is used to stabilize the output of the light source; thereby substantially reducing the undesirable drift.

Figure 6:
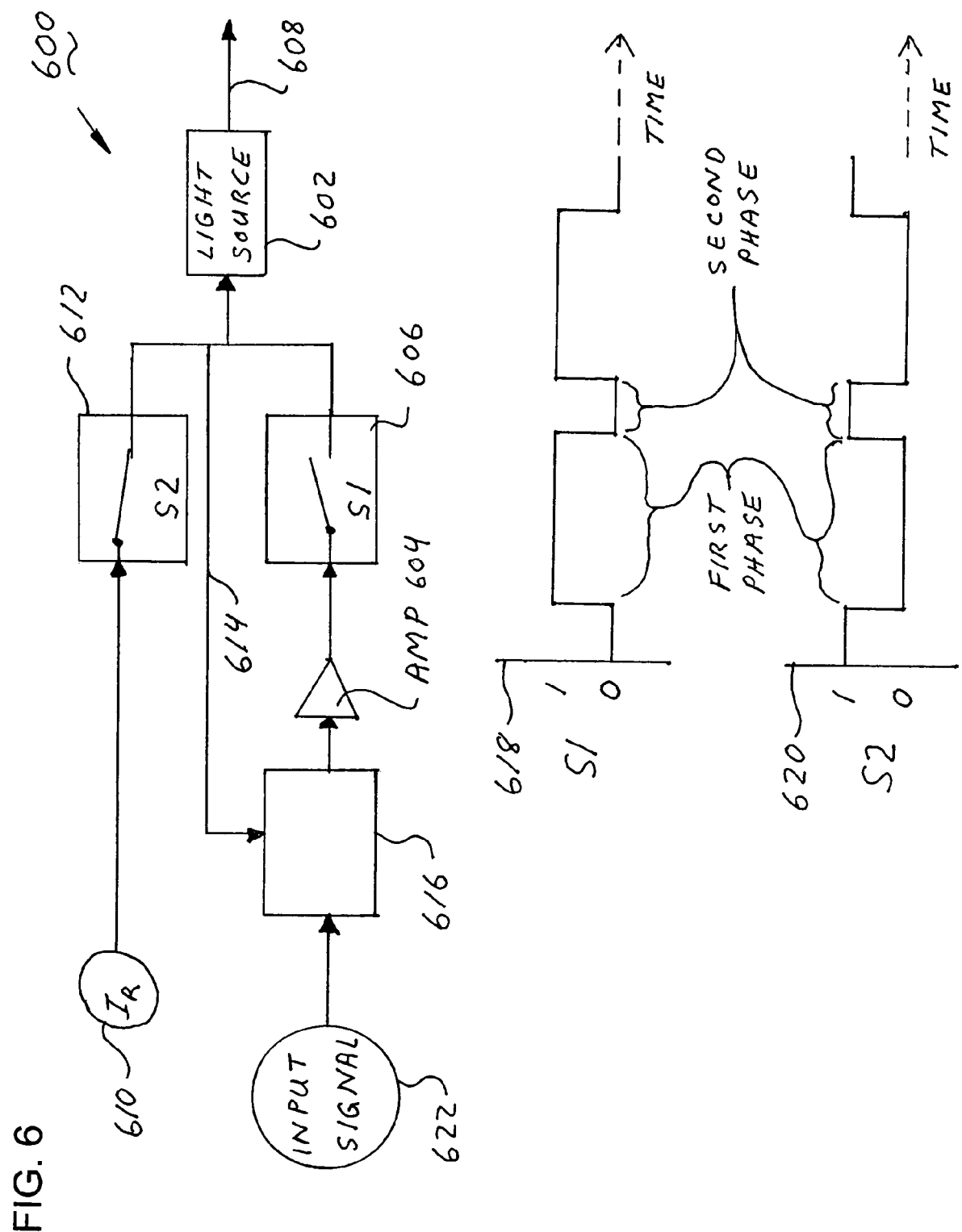
FIG. 6 depicts self-calibration of light source amplitude according to one embodiment of the invention.

FIG. 6 depicts self-calibration of light source amplitude according to one embodiment of the invention, illustrated generally at 600. With reference to FIG. 6, a light source 602 produces light 608 to be used in devices for capturing an image as described above in conjunction with FIG. 4A and FIG. 4C and for devices used to display images which are described more completely below in the figures that follow. In one embodiment, the light source 602 is driven by amplifier 604 at a constant voltage; the output of the amplifier 604 can be interrupted by switch (S1) 606. A reference current source 610 is connected through switch (S2) 612 to the input of the light source 602.

As described above, a device scans a beam across a surface to capture an image. In one embodiment, during the scanning process, the scanned beam moves in a raster pattern to illuminate the surface to be imaged with a beam of light. During the process of scanning, the scanned beam can be directed into and out of the region to be imaged. The region that is not being imaged can be referred to as the overscan region. While the scanned beam is in the overscan region, a calibration is performed on the light source 602.

In one embodiment, the process of self-calibration proceeds with a first phase where a beam of light illuminates a surface to be scanned, either illuminating the surface with optical energy for the purpose of producing scattered optical energy from the surface or the beam of light scans image data to be viewed as in a display device (described more fully below in conjunction with FIG. 9). During the first phase of operation, switch (S1) 606 is closed and switch (S2) 612 is open as indicated at 618 and 620 (first phase). During the second phase of operation, switch 606 opens and switch 612 closes, as indicated at 618 and 620 (second phase). When switch 612 is closed, a reference current is supplied to the input of the light source 602. A reference voltage 614 is measured that corresponds to the reference current. In one embodiment, the reference voltage is used at 616 to adjust the drive level at the input of the amplifier 604 to account for drift in the current-voltage characteristic of the light source 602 during the next period of operation.

Operation of the system continues with alternating first phase (image acquisition or image display), and second phase (calibration); thereby, compensating for the non-ideality of a drifting light source current-voltage characteristic. The calibration periods can be chosen to be frequent, such as once every time a line of image data is either acquired or displayed, or can occur relatively infrequently as desired. Alternatively, the method can commence with the second phase (calibration) followed by the first phase (image acquisition or image display). In this case the calibration would occur first and the image acquisition or display would occur second.

When the system 600 is implemented in a device used to scan a beam of light for display to a user or viewer, the image signal to be displayed is input at 622. Scanned beam devices used to display image data to a user or viewer are described more fully below in the figures that follow.

Figure 7A:
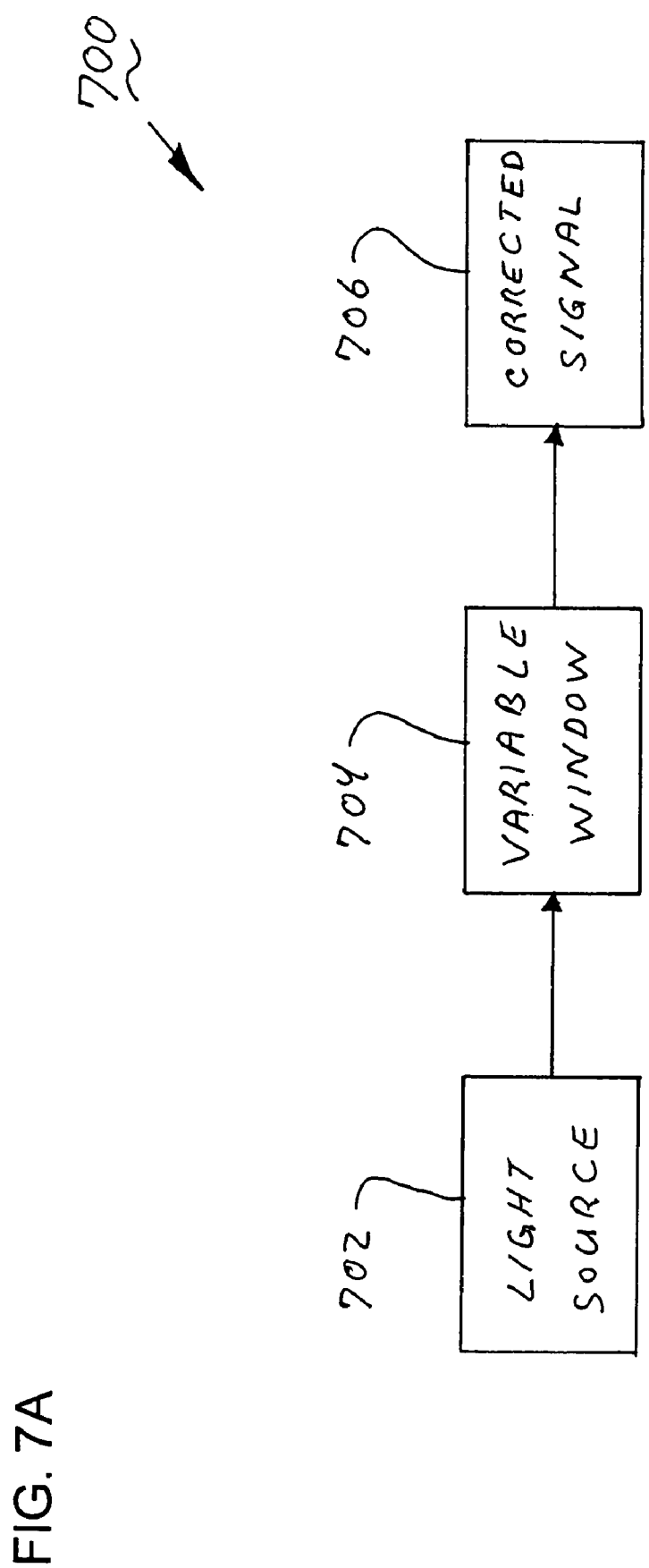
FIG. 7A illustrates methods of controlling a beam of light according to embodiments of the invention.

FIG. 7A illustrates generally at 700, methods of controlling a beam of light according to embodiments of the invention. With reference to FIG. 7A, a light source 702 creates a beam of light. A variable window 704 is placed in the optical path. The variable window has a time domain response that is tailored to provide a uniform output; the uniform output is indicated as corrected signal 706. The time domain response is tailored to provide an inverse fluctuation with respect to fluctuations in the input optical signal created by the light source 702. In one embodiment, the variable window 704 is made using a photo optic polymeric material. The photo optic material may function, for example, as a photo absorber to attenuate fluctuations in the amplitude of the light beam created by the light source 702 that are above a desired level, while allowing the optical energy to pass through when the amplitude is below the desired level.

Figure 7B:
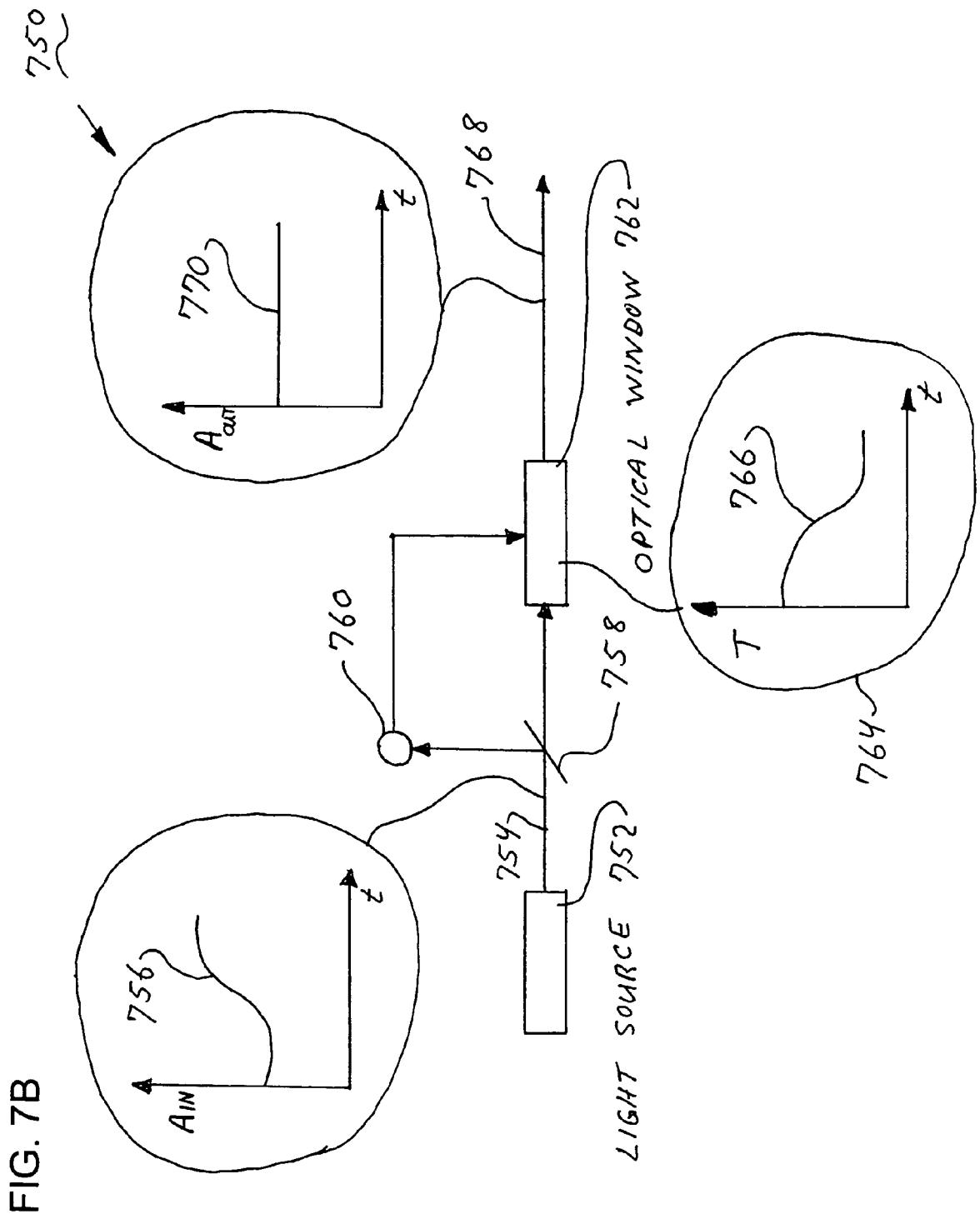
FIG. 7B illustrates a variable optical window according to one embodiment of the invention.

In one embodiment, a variable optical window is shown in FIG. 7B at 750. With reference to FIG. 7B, a light source 752 creates a beam of light 754 that has an amplitude 756 that fluctuates as a function of time due to various non-idealities as described above. A portion of the beam of light is diverted by device 758 and is detected by detector 760. In one or more embodiments, the detector 760 can be a PIN photodiode, an APD, a PMT, etc. which converts the optical energy into an electrical signal. In one embodiment, an analog to digital converter (not shown) converts the analog signal to a digital signal.

The output of the detector 760 is used as a reference to drive the optical window 762. The optical window 762 has a time domain response 766 as shown at 764, which provides an optical output 768 with amplitude 770. The temporal fluctuations are removed from the output signal 768 by the response of the optical window 762.

The optical window 762 can be constructed in a variety of ways. In one embodiment, an electrically controlled window is constructed using a photo chromic or electro chromic material. In one embodiment, the optical window 762 is made using a liquid crystal material (LCD). Such an optical window 762 corrects the temporal amplitude fluctuations in the output of the light source 752 that occur in the 1-100 kilohertz range. Other embodiments are readily adapted to address non-idealities occurring in different frequency regimes within the light source output.

Figure 8:
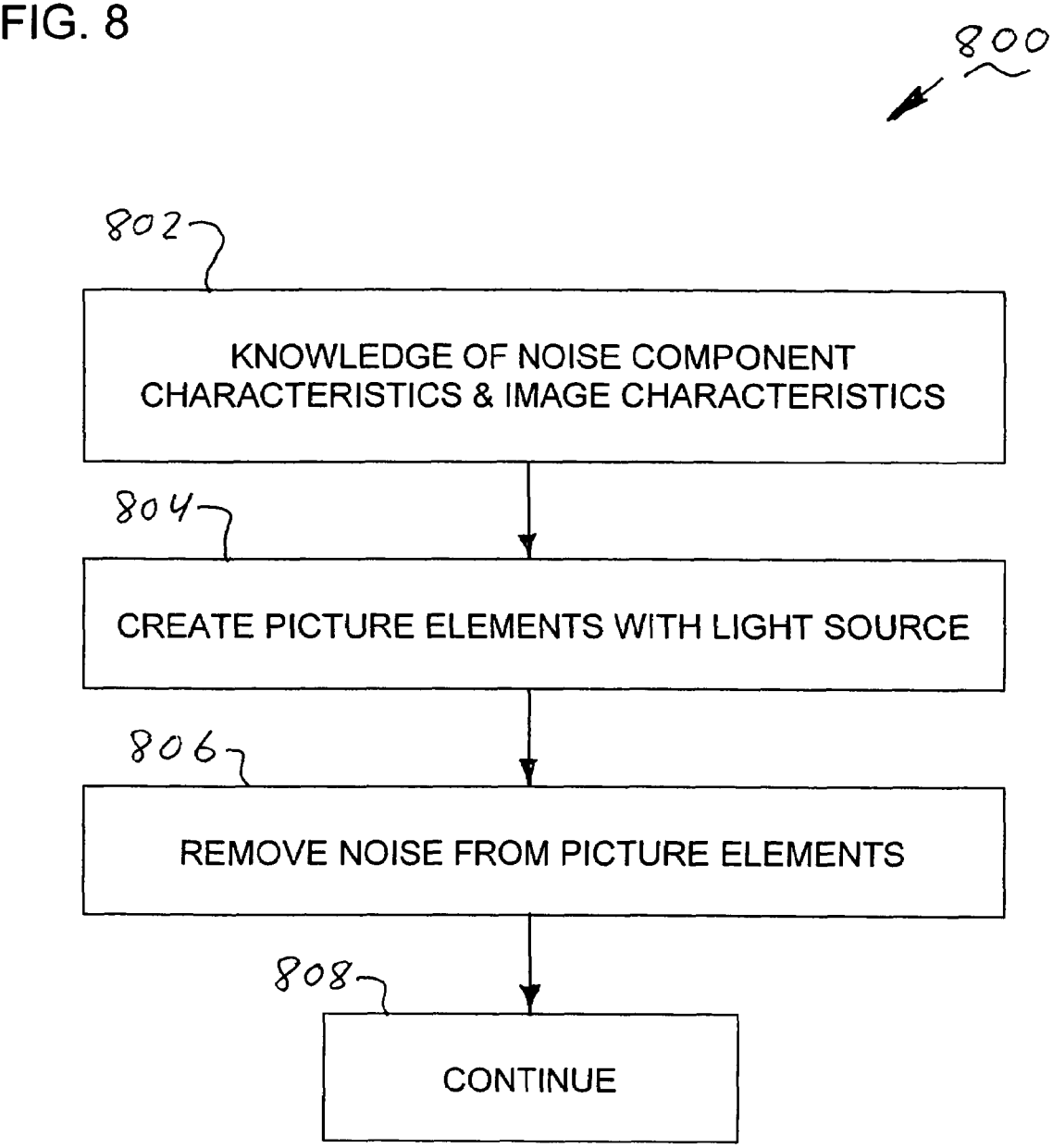
FIG. 8 illustrates removal of noise components from an image according to one embodiment of the invention.

As described above, non-idealities in the properties of a light source will lead to noise in the image acquired. In various embodiments, the effects of noise on the image acquired are removed after the image is acquired by filtering the image. FIG. 8 illustrates generally at 800, removal of noise components from an image according to various embodiments of the invention. With reference to FIG. 8, a method for removing the effects of noise from the image acquired starts with some knowledge of the characteristics of the noise components and the image at 802. An image is acquired at 804 and the effects of noise are removed at 806. Processing may then optionally continue at 808.

In various embodiments, the identification of noise components in image data can be performed in the time domain, where the relative phase information exists between the different light sources or the identification can be performed in image space after the image data has been acquired.

In one or more embodiments, when three light sources are used to acquire a color image, such as a red, green, and blue (RGB) triad, it is typically the situation with most images that a noise component will show up as a periodic phase relationship between any two of the light sources, for example between the R and the B or between the R and G. In one or more embodiments, if one light source is known to be stable, such as the R, then the other, the B, and/or the G, is determined to have noise on it.

In one or more embodiments, the image is captured and analyzed to determine if any noise components are present that need to be removed. Most images produce RGB data that does not change disparately fast or disparately slowly across the color channels R, G, and B. For example, when creating an image from a surface that includes two differently colored surfaces such as the flesh tone of a person and a wall of a room, or when imaging across either one individually, one of the R, G, or B color channels generally does not have a real periodicity that does not show up at least at some level within the other color channels. That is, many real images are found to have correlation between variations in the color channels. If a periodicity is detected in a given color channel that is not present in the other channels then, depending upon the application, there may be a probability that the periodicity is a noise component and can be removed. On the other hand, if the fluctuation in a channel is constant from frame-to-frame within the image, there is a probability that the fluctuation is a real image attribute and the periodic fluctuation should not be removed from the output image.

In one embodiment, an example of such a periodicity in the image is amplitude noise on the output of a blue light source. In one example, a DPSS laser is known to exhibit amplitude noise in the band of 1-100 kilohertz. A scanner such as the scanner described in conjunction with FIG. 4A through FIG. 4C is typically operated in a horizontal scan direction within the frequency band of 15 to 20 kilohertz. In one embodiment operation of the scanner in the horizontal scan mode at 19 kilohertz approximates Super Video Graphics Array (SVGA) graphics resolution. Amplitude noise components present on the output of a particular light source, such as the blue or green light source, can create undesirable periodic features in the image. Analysis of the color channels composing the image data is undertaken and the undesired periodic noise signal is removed from the image data.

Removal of noise components from the image data must be done with care so that actual image data is not removed in the process of removing the unwanted noise component. Indicators exist, which can be used to help eliminate the removal of actual image data. For example, one indicator is that the color channels may have variations on them that vary with a periodicity corresponding to a sampling frequency. For example a periodicity corresponding to a line scan time may be due to an edge or variation in the image itself. Variations that may be related, through image analysis, to a contiguous set of points are generally not removed because of the probability they correspond to actual image features. Similarly, the probability is high that variations that occur simultaneously in all three color channels are related to the real image, and therefore, these variations are not removed. On the other hand, variations that occur randomly in a single color channel, especially with a channel having a light source known to be noisy, probably do relate to noise, and these variations are attenuated during image processing to eliminate the unwanted source noise. These correlations, as well as others, can be used to determine whether or not the suspect signal should or should not be removed from the image.

Figure 9:
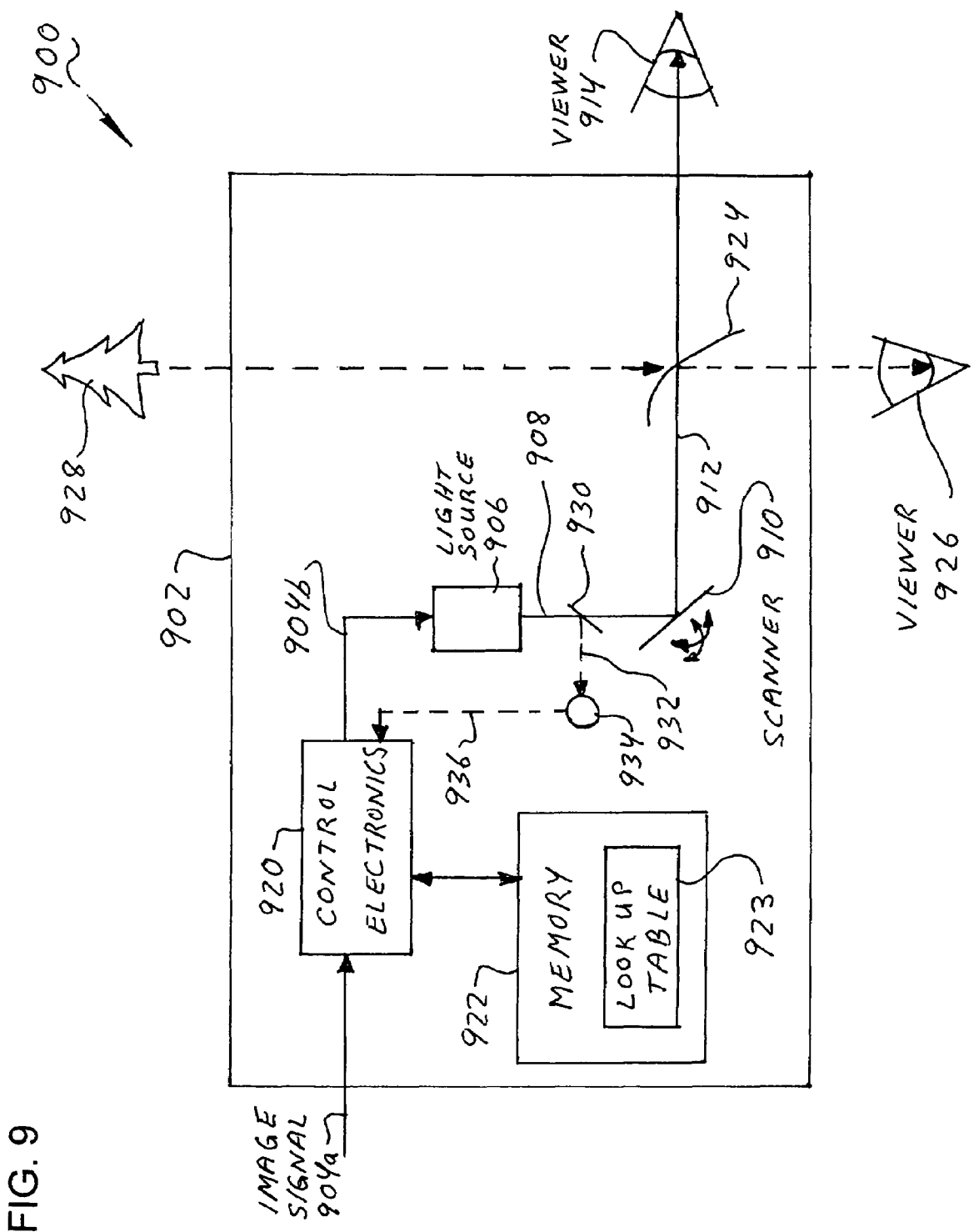
FIG. 9 shows correction of light source non-idealities in a device used to display an image according to one embodiment of the invention.

FIG. 9 shows generally at 900, correction of light source non-idealities in a device used to display an image according to one embodiment of the invention. With reference to FIG. 9, a scanned beam display 902 receives a source of an image(s), such as a signal 904a, which in one embodiment, will be scanned onto the retina of a viewer's eye 914. While the system as presented in FIG. 9, scans light containing image data onto the viewer's eye 914, the structures and concepts presented herein can be applied to other types of displays, such as projection displays that include viewing screens, etc.

Control electronics 920 provide electrical signals that control operation of the display 902 in response to the signal 904a. Signal 904a can originate from a source such as a computer, a television receiver, videocassette player, DVD player, remote sensor, or similar device. In one embodiment, a similar device is an imaging sensor in a digital camera or a digital video camera, etc.

The light source(s) 906 outputs a modulated light beam(s) 908. The light beam(s) has a modulation which corresponds to information in the image signal. In one embodiment, light source 906 is a triad of light sources comprising the colors red, green, and blue (RGB). In other embodiments, the light sources can include more or less than three individual light sources, additionally the light sources can utilize colors other than or in addition to the colors red, green, and blue. The light source 906 can utilize a coherent light source such as a laser diode, a diode pumped solid state (DPSS) laser, a laser, etc. The light source 906 can also utilize a non-coherent source such as a light emitting diode (LED). The light source 906 can include directly modulated light emitters such as the LEDs or may use continuous light emitters indirectly modulated by an external modulator such as an acousto-optic modulator.

A scanner 910 deflects the modulated light beam 908 to produce scanned beam 912 which is scanned onto the retina of the viewer's eye 914. The scanner 910 is typically a bidirectional scanner that scans in both the horizontal and vertical directions to produce the image. In various embodiments, the scanner 910 has been described in preceding figures.

In an alternative embodiment, an optional lens 924 is included; the lens 924 is formed from a curved partially transmissive mirror that shapes and focuses the scanned beam 912 for viewing by the viewer's eye 926. Because the lens 924 is partially transmissive, the lens 924 combines the light from the scanner 910 with the light received from the background 928 to produce a combined input to the viewer's eye 926. Although the background 928 presented here is a "real-world" background (tree) the background light can be occluded as it is when the display is viewed at 914. One skilled in the art will recognize that a variety of other structures may replace or supplement the lenses and structures shown in FIG. 9. For example, a diffractive element such as a Fresnel lens may replace the lens 924. Alternatively, a beamsplitter and lens may replace the partially transmissive mirror structure of the lens 924. Other optical elements, such as polarizing filters, color filters, exit pupil expanders, chromatic correction elements, eye tracking elements, and background masks may also be incorporated for certain applications.

In one embodiment, various non-idealities in the amplitude of the output of the light source 906 can be corrected with the system 600 described in FIG. 6. Control electronics 920 together with the light source 906 can be operated to perform a self-calibration in the overscan regions during display of the image data for viewing by a viewer at 914 or 926. Similar to the image capture device described above in the preceding figures, the scanned beam 912 can be made to travel through a first region, such as the field of view (FOV) and into a second region, an overscan region, where illumination of the light source is not visible to the viewer. In the overscan region, a reference signal is applied to the light source. A parameter of the light source is measured in response to the reference current, and the light source drive is adjusted as a function of the measured parameter. In one embodiment, the light source is a light emitting diode (LED), the reference signal is a reference current and the parameter that is measured is the forward voltage on the LED.

In another embodiment, a shape of a spectral power distribution (SPD) of energy output from an InGaN-based blue or green edge emitting light emitting diode (EELED) changes as a function of drive level. The drive level dependence causes a shift in a dominant wavelength of the light source that is generally known a priori. To compensate for such a non-ideality, a transformation is performed. The transformation is based on the color information within signal 904a and the known shift in light source dominant wavelength that will occur if the signal 904a is displayed without correction. The properties of color contained in the signal 904a can vary according to the application; however, in one embodiment the color information includes information on hue, saturation, and luminance. In one embodiment, on a picture element (pixel) basis, the transformation transforms the white point of a color gamut while maintaining a constant luminance between the signal 904a and the luminance that will result subsequent to modulation of the light sources, such that the signal 904b can be displayed throughout the range of light modulation levels required to display the image data.

In one embodiment, a lookup table 923 is stored in memory 922. The lookup table 923 facilitates transformation of the picture element information; thereby, correcting for the shift in white balance resulting from the drive dependent shape of the spectral power distribution (SPD) of the EELED light sources. In one embodiment, a further description of a set of algorithms used to generate the lookup table 923 is provided in conjunction with FIG. 14 through FIG. 19 below.

The shift in SPD as a function of drive level, previously described, is an example of a light source non-ideality that can be known a priori and can be compensated for down to the picture element (pixel) level with the methods described above, such as using a lookup table or performing other data processing as is appropriate.

In another embodiment, when a non-ideality remains relatively constant for a time period that lasts longer than a pixel duration (a pixel duration is typically 18 nanoseconds) the effects of the non-ideality can be corrected by obtaining information on the dominant wavelength of the light source and then using the information to perform the necessary correction to the image data at 920. In some embodiments, a non-ideality occurs (which can be substantially constant over time) when a light source is used to either capture an image or to display an image and the light source has a dominant wavelength that produces a color gamut (when used in conjunction with additional light sources) that is offset from a color gamut that would have been produced if the light source had a different dominant wavelength. Such non-idealities are corrected in various embodiments as described below.

In one embodiment, a device 930 diverts a portion 932 of the output of the light source 906 to a device 934. In one embodiment, the device 930 is a partially transmissive mirror. The device 934 is a device that provides information on the dominant wavelength of the light source and in some embodiments a measure of a spectral power distribution (SPD) of the light source such as a spectrometer. For cases where a SPD is compensated for, the term detector should be taken to include SPD detecting devices. A spectral power distribution of a light source and the associated dominant wavelength are described below in conjunction with FIG. 12. It will be recognized by those of skill in the art that a dominant wavelength of a light source provides information on a SPD of the light source; the dominant wavelength of the light source is the portion of the SPD where a majority of the spectral power resides. For the purpose of this description, the terms "dominant wavelength" or "information on a dominant wavelength" of a light source will be considered to include information on a SPD of the light source. Information on the dominant wavelength of the light source 906 is output from the device 934 and is input at 936 to control electronics 920.

The control electronics 920 utilize the measured information on the dominant wavelength(s) of the light source(s) to perform the color transformation and adjustment to the modulation of the light sources to compensate for the shift in dominant wavelength of the light source(s). Image information, input at 904a, contains color information for the picture elements (pixels) that compose the image or images. The properties of color contained in such images can vary according to the application. For example, discussion above referred to RGB values. In other embodiments, such values may be transformed to hue, saturation, and luminance. In one embodiment, a transformation is applied to the signal 904a to transform the color associated with signal 904a to account for a shift in the dominant wavelength of a light source(s), resulting in signal 904b. In another embodiment, a transformation is applied to the signal 904a to account for a system 900 that is made using light sources that produce a color gamut other than the color gamut of interest. Such transformations are performed by taking the color information of the picture element or elements (904a) and transforming that information using a mathematical model to describe color to produce signal 904b. Various models for color and transformation of color are described more fully below in conjunction with FIG. 14 through FIG. 19.

In various embodiments, the methods and apparatuses described herein are used to correct non-idealities of component or subsystem properties. These methods and apparatuses can be used in implementations of systems that correct for various characteristics of scanned beam devices described herein.

Figure 10:
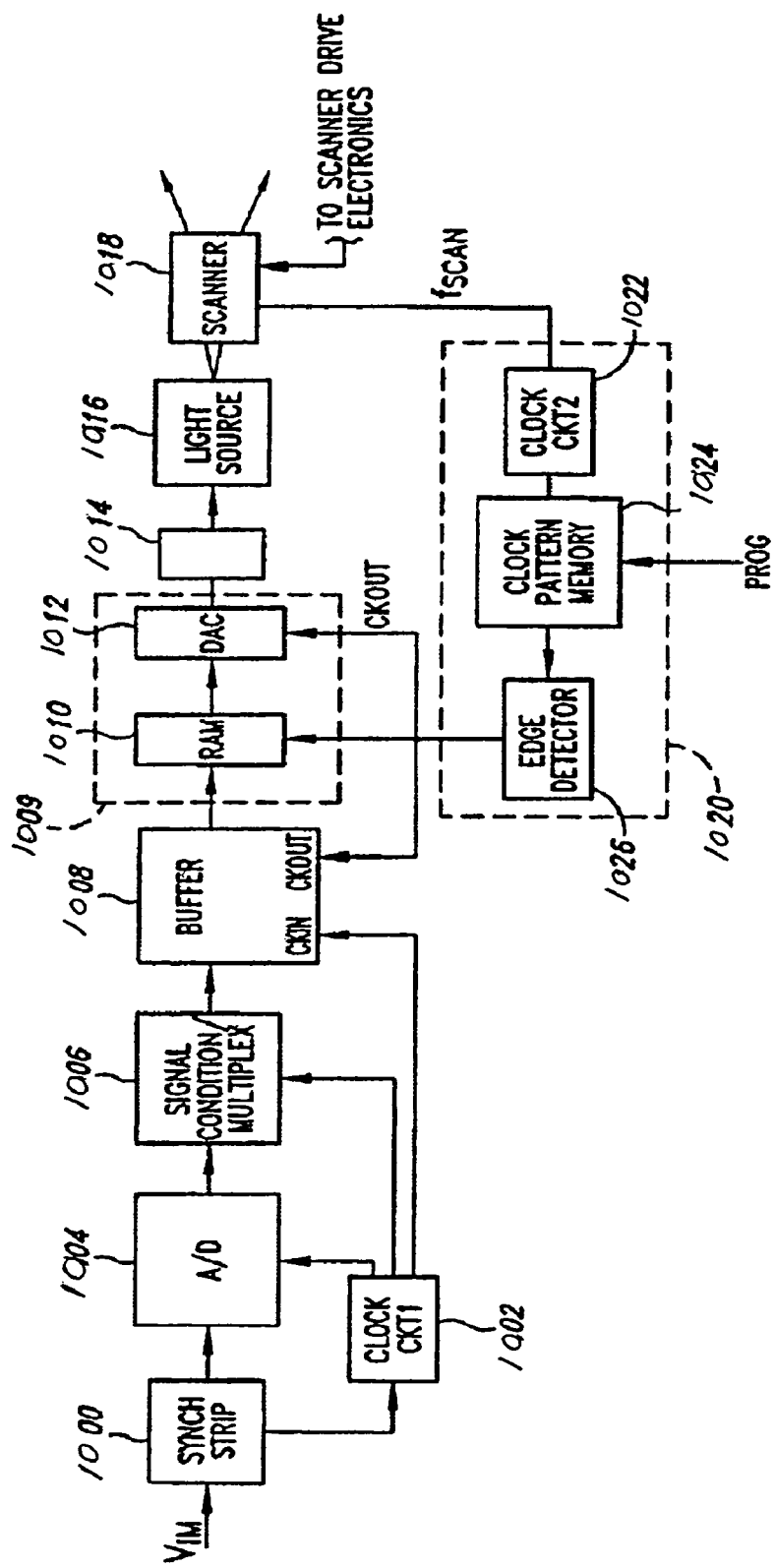
FIG. 10 is a block diagram of a first system for generating an output clock to retrieve data from a memory matrix while compensating for nonlinear scan speed of the resonant mirror, according to one embodiment of the invention.

FIG. 10 is a block diagram of a first system for generating an output clock to retrieve data from a memory matrix while compensating for nonlinear scan speed of the resonant mirror, according to one embodiment of the invention. In the embodiment shown in FIG. 10, a corrected clock is produced from a pattern generator rather than a counter to control clocking of output data. A synch signal stripper 1000 strips the horizontal synchronization signal from an arriving image signal $V_{IM}$. Responsive to the synch signal, a phase locked loop 1002 produces a series of clock pulses that are locked to the synch signal. An A/D converter 1004, driven by the clock pulses, samples the video portion of the image signal to produce sampled input data. The sampling rate will depend upon the required resolution of the system. In the preferred embodiment, the sampling rate is approximately 40 MHz. A programmable gate array 1006 conditions the data from the A/D converter 1004 to produce a set of image data that are stored in a buffer 1008. One skilled in the art will recognize that, for each horizontal synch signal, the buffer will receive one line of image data. For a 1480×1024 pixel display, the system will sample and store 1480 sets of image data during a single period of the video signal.

Once each line of data is stored in the buffer 1008, the buffer is clocked to output the data to a RAMDAC 1009 that includes a gamma correction memory 1010 containing corrected data. Instead of using the buffer data as a data input to the gamma correction memory 1010, the buffer data is used to produce addressing data to retrieve the corrected data from the gamma correction memory 1010. For example, a set of image data corresponding to a selected image intensity 11 identifies a corresponding location in the gamma correction memory 1010. Rather than output the actual image data, the gamma correction memory 1010 outputs a set of corrected data that will produce the proper light intensity at the user's eye. The corrected data is determined analytically and empirically by characterizing the overall scanning system, including the transmissivity of various components, the intensity versus current response of the light source, diffractive and aperture effects of the components and a variety of other system characteristics.

Figure 11:
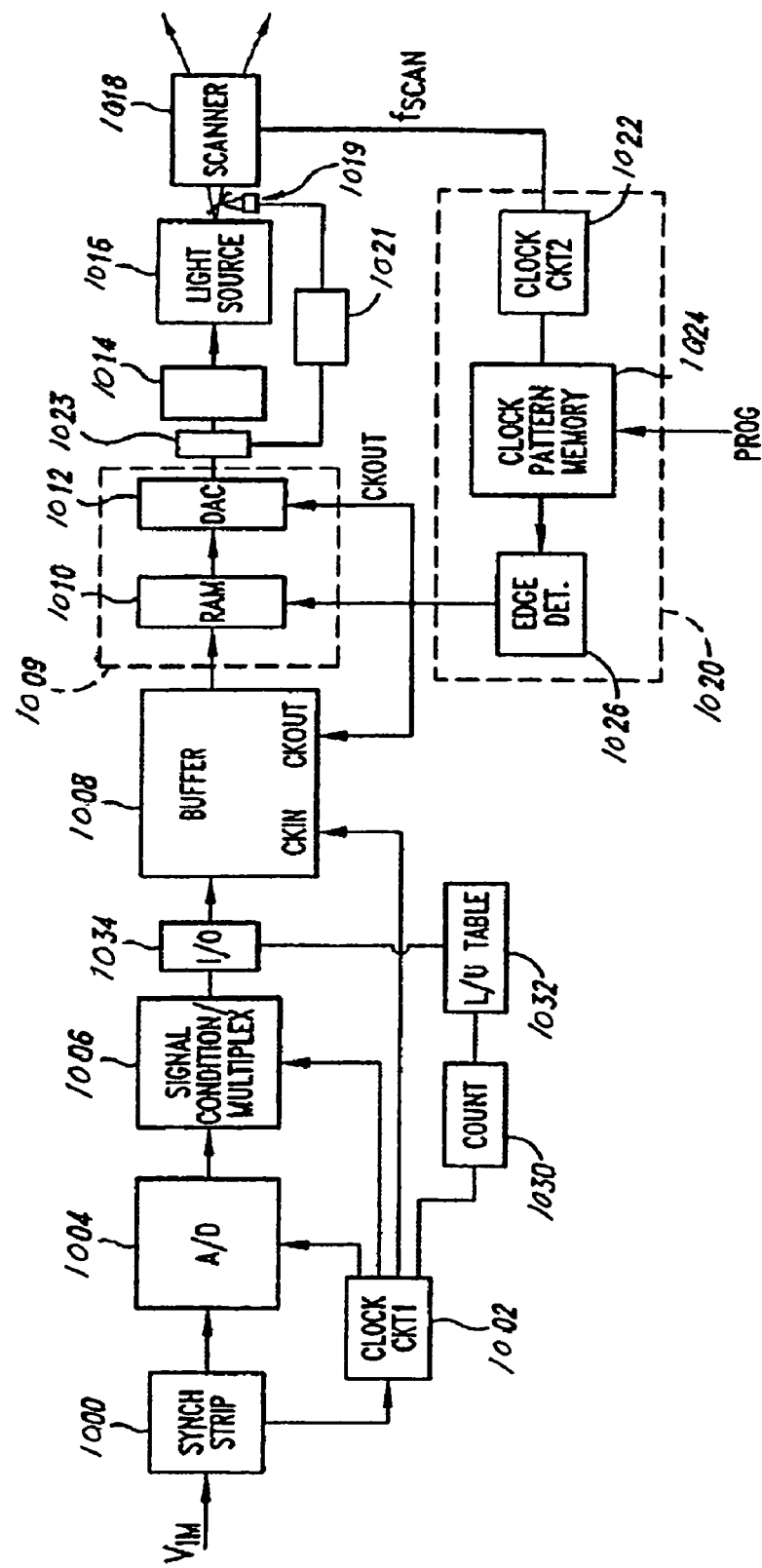
FIG. 11 is a block diagram of an alternative embodiment of the apparatus of the block diagram of FIG. 10.

FIG. 11 is a block diagram of an alternative embodiment of the apparatus of the block diagram of FIG. 10. In one embodiment shown in FIG. 11 according to the invention, the data may be corrected for temperature-versus-intensity or age-versus-intensity variations of the light source. Reference data drives the light source. For example, at the edge of the horizontal scan, the reference data is set to a predetermined light intensity. A detector 1019 monitors the power out of the light source 1016 and optionally a temperature compensation circuit 1021. If the intensity is higher than the predetermined light intensity, a gain circuit 1023 scales the signal from the RAMDAC 1009 by a correction factor that is less than one. If the intensity is higher than the predetermined light intensity, the correction factor is greater than one. While the embodiments described herein pick off a portion of the unmodulated beam or sample the beam during non-display portions of the scanning period, the invention is not so limited. For example, a portion of the modulated beam can be picked-off during the display portion of the scanning period or continuously. The intensity of the picked-off portion of the modulated beam is then scaled and compared to the input video signal to determine shifts in the relative intensity of the displayed light versus the desired level of the displayed light to monitor variations.

In addition to monitoring the intensity, the system can also compensate for pattern dependent heating through the same correction data or by multiplying by a second correction factor. For example, where the displayed pattern includes a large area of high light intensity, the light source temperature will increase due to the extended period of high level activation. Because data corresponding to the image signal is stored in a buffer, the data is available prior to the actual activation of the light source 1016. Accordingly, the system can "look-ahead" to predict the amount of heating produced by the pattern. For example, if the light source will be highly activated for the 50 pixels preceding the target pixel, the system can predict an approximate pattern dependent heat effect. The correction factor can then be calculated based upon the predicted pattern dependent heating. Although the correction has been described herein for the intensity generally, the correction in many embodiments can be applied independently for red, green and blue wavelengths to compensate for different responses of the emitters and for variations in pattern colors. Compensating for each wavelength independently can help limit color imbalance due to differing variations in the signal to intensity responses of the light emitters. Alternatively, compensation may be performed on fewer than all wavelengths.

Returning to FIG. 10, the corrected data output from the gamma correction memory 1010 (as it may be modified for intensity variations) drives a signal shaping circuit 1014 that amplifies and processes the corrected analog signal to produce an input signal to a light source 1016. In response, the light source 1016 outputs light modulated according to the corrected data from the gamma correction memory 1010. The modulated light enters a scanner 1018 to produce scanned, modulated light for viewing.

Figure 12:
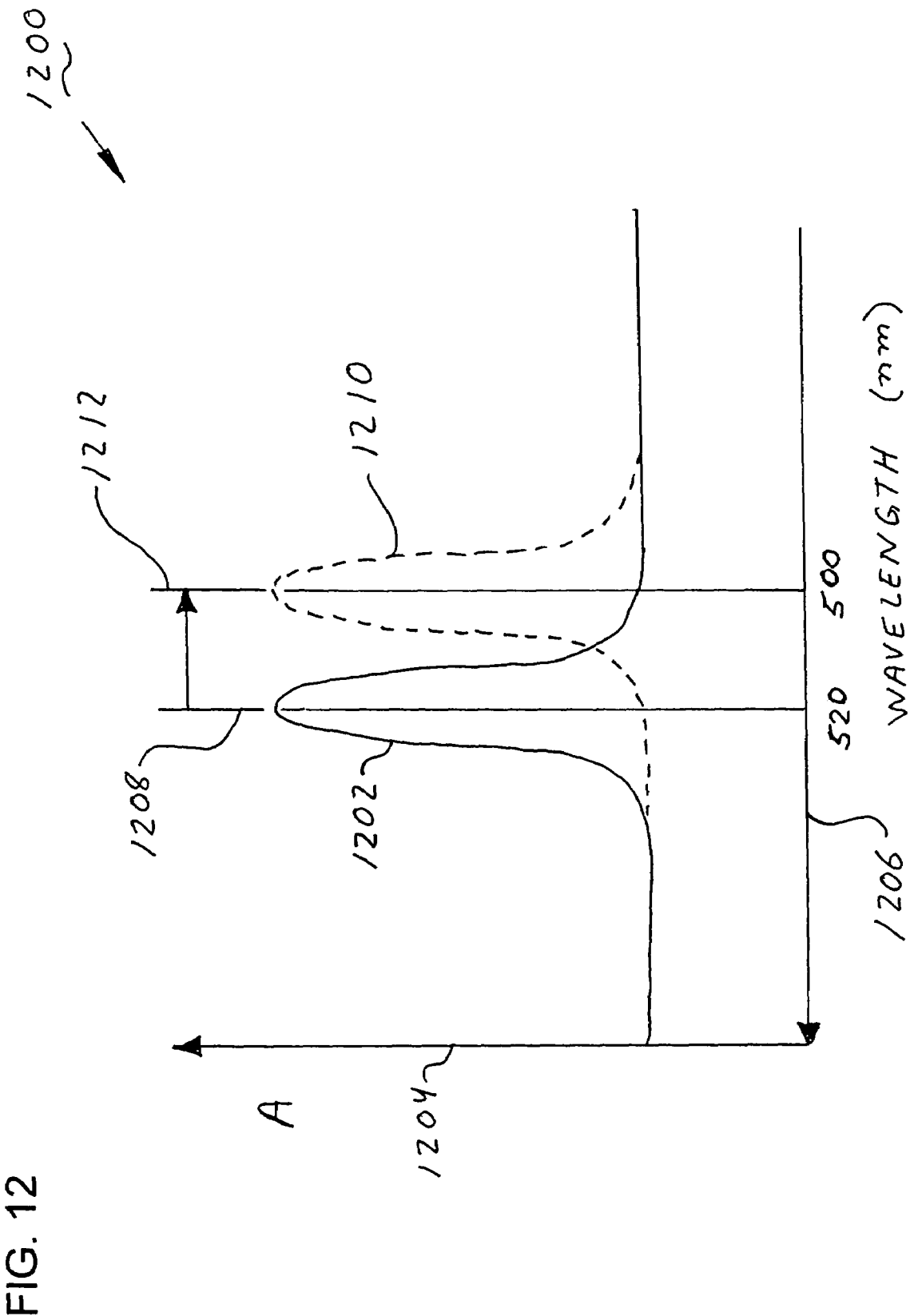
FIG. 12 shows a shift in a dominant wavelength of an InGaN-based green edge emitting light emitting diode (EE-LED) at two different drive levels.

As described above, non-idealities in light source parameters can cause a shift in a spectral power distribution of a light source and a corresponding change in a dominant wavelength of the light source. FIG. 12 shows, generally at 1200, a shift in a dominant wavelength of an InGaN-based green edge emitting light emitting diode (EELED) at two different drive levels. With reference to FIG. 12, a spectral power distribution 1202 is plotted for the InGaN-based green EELED. The horizontal axis 1206 corresponds to wavelength and the vertical axis 1204 corresponds to magnitude of the spectral power distributions plotted thereon. A peak 1208 of the SPD 1202 corresponds to a dominant wavelength of the light source at a first drive level $d_1$.

In one embodiment, during modulation of the light source, the drive level is changed to $d_2$. A new spectral power distribution (SPD) 1210 results at drive level $d_2$. PSD 1210 has a corresponding dominant wavelength 1212. It will be observed from FIG. 12 that 1208 corresponds to a wavelength of 520 nanometers and 1212 corresponds to 500 nanometers.

In one embodiment, an InGaN-based blue light source can be used along with a red light source to display image data; such a triad of light sources is capable of producing a color gamut. Other numbers of light sources can be used to produce a color gamut, such as four, five, six, etc. Various constructs have been developed to describe color. One system used frequently with electronic display systems is RGB, which correlates spectral distribution and intensity to the output of conventional three-channel display systems. Another system; hue, saturation, and luminance; may be especially useful in transformations that require linearly independent variables. Constructs include, the Commission Internationale de l'Eclairage (CIE) system, the Munsell Color System, the Ostwald Color System, the Newton Color Circle, etc. In one embodiment, a method of transforming image data from a first color gamut to a second color gamut is described utilizing the CIE system; however, other color systems can be used as well as empirical methods, embodiments of the present invention are not limited to transformations using one particular system.

Figure 13:
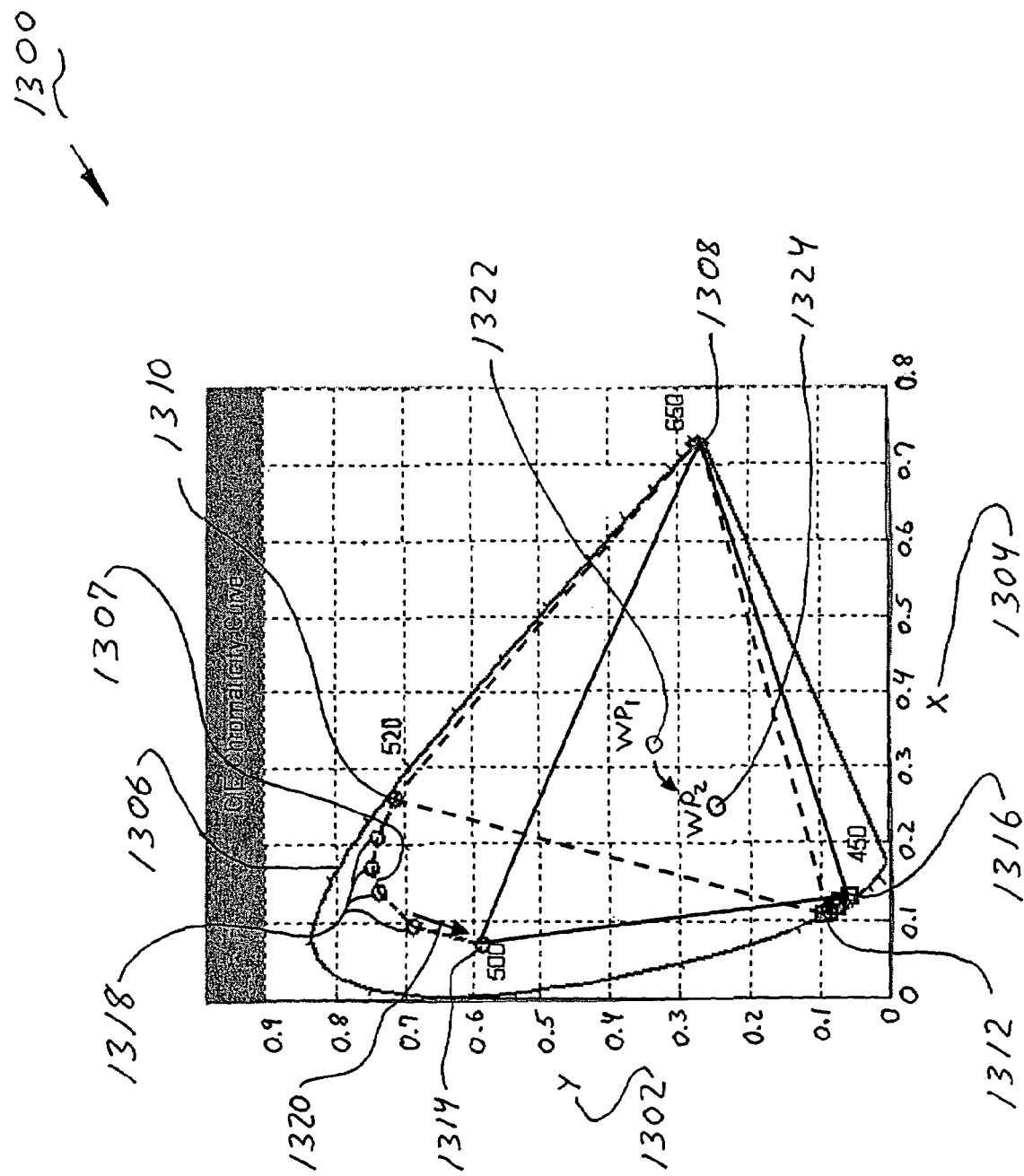
FIG. 13 shows a shift of in a color gamut for a device utilizing red, green, and blue EELEDs.

FIG. 13 shows, generally at 1300, a shift of a color gamut for a device utilizing a red light source, and a green and blue EELED as light sources. With reference to FIG. 13, the CIE color space is shown with the x chromaticity coordinate plotted at 1304 and the y chromaticity coordinate plotted at 1302. The chromaticity coordinates x and y map all colors perceivable to the human eye within a curve defined by 1306. The spectral colors that are within the visible color spectrum are found along the curve 1306.

In one embodiment, operation of three light sources is defined by the points 1308, 1310, and 1312 and creates a first color gamut indicated by the area within the triangular region, defined by the dashed line. The color gamut has a white point at 1322. Point 1310 corresponds to drive level $d_1$ (FIG. 12) and the corresponding dominant wavelength 1208 (FIG. 12) at 520 nanometers. Drive level $d_2$, (FIG. 12) results in a shift of the dominant wavelength of the light source to 1212 (FIG. 12) at 500 nanometers, which creates a new color gamut defined by the triangular region prescribed by points 1308, 1314, and 1316 (FIG. 13). In the embodiment illustrated in FIG. 13, the dominant wavelength of the blue light source has also shifted from 1312 at a first drive level to 1316 at a second drive level. The new color gamut has a white point 1324, which is different from the white point of the first color gamut 1322.

Various other color gamuts (and the accompanying shift in white balance) will result as the light sources are modulated over a range of drive levels which are necessary to display the image data. As an example, the green light source will trace a path along curve 1307 as its drive level is incremented from $d_1$ to $d_2$. Such intermediate locations are indicated for illustration purposes only as points 1318; the movement is indicated by arrow 1320. Such a situation of shifting color gamuts may produce undesirable results in the displayed image. In one embodiment, these undesirable results are compensated for by transforming colors from one color gamut to another.

Figure 14:
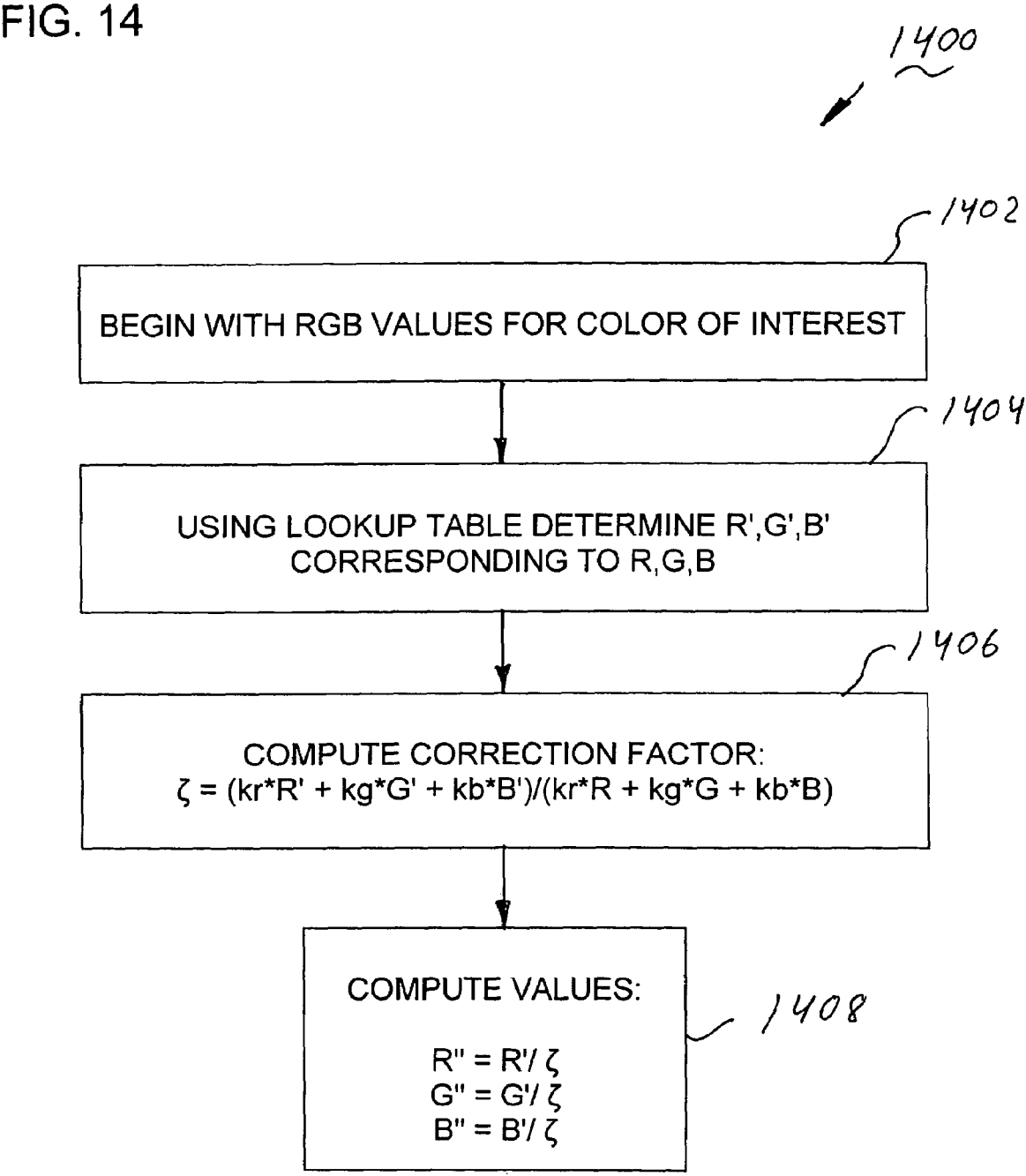
FIG. 14 is a flow chart of a technique used to perform color correction according to one embodiment of the invention.

FIG. 14 is a flow chart 1400 of a technique used to perform color correction according to one embodiment of the invention. With reference to FIG. 14, image data (pixels) are transformed to provide proper white balance and color rendering over a range of luminance levels. The technique begins at block 1402, where picture element information (pixel) is input in the form of normalized RGB (red, green, blue) data, whose values span a range of 0 to 1 and which are characterized by a white point, R=G=B=1. In one embodiment, the white point is the D6500 white point.

Block 1404 maps an input RGB value to an R'G'B' value. The R'G'B' value maintains the total luminance of the RGB value while adjusting the combined chromaticity coordinates to match the white point of the RGB value. In one embodiment the mapping from RGB to R'G'B' is done with a lookup table. The lookup table can be generated in a variety of ways such as empirically or by using known (measured) EELED dominant wavelength/luminance dependencies and an iterative search algorithm described below.

A correction factor is calculated at block 1406, where the $k_r$, $k_g$, and $k_b$ values are equal to scaling factors chosen to generate a desired white point at full luminance for a given system. A transformed R"G"B" value is obtained at block 1408. In one embodiment, the transformation of a general RGB color value (that is not the white point or a spectral color) is done by interpolating between the white point and the spectral colors.

Figure 15:
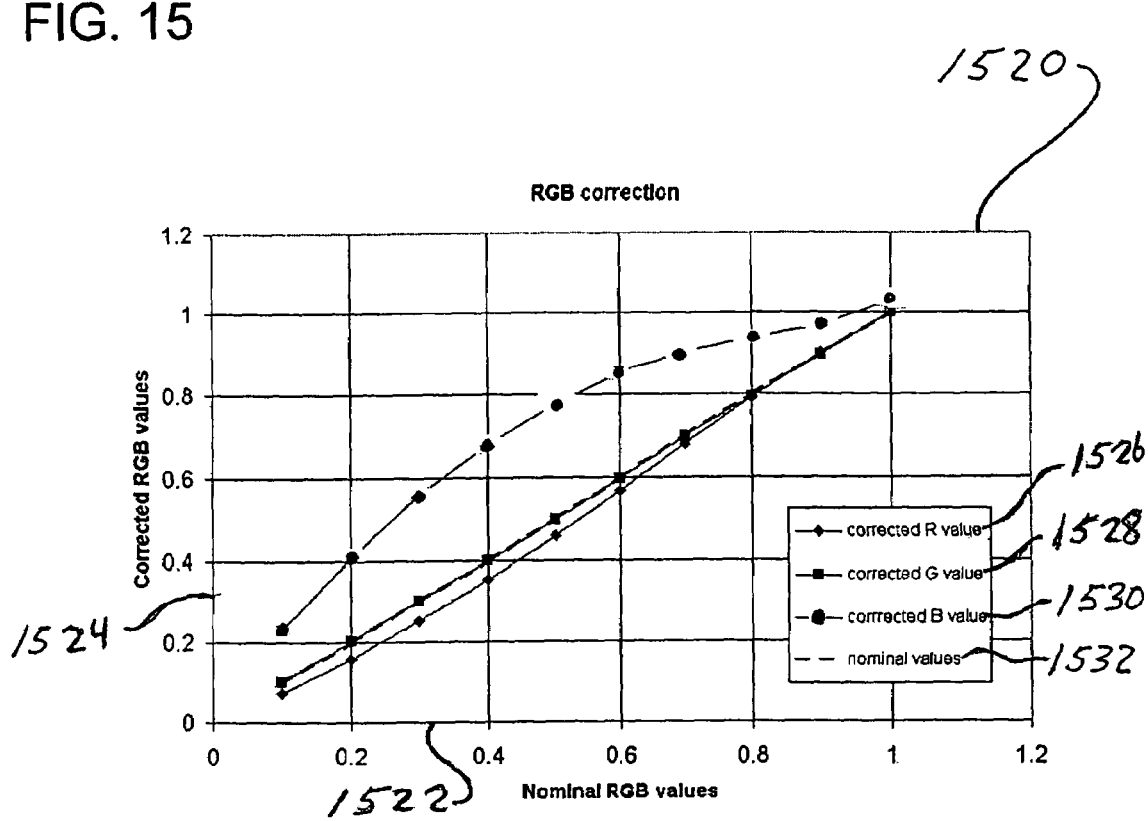
FIG. 15 illustrates correction of the white point of a color gamut, as a function of luminance level, according to one embodiment of the invention.
Figure 15:
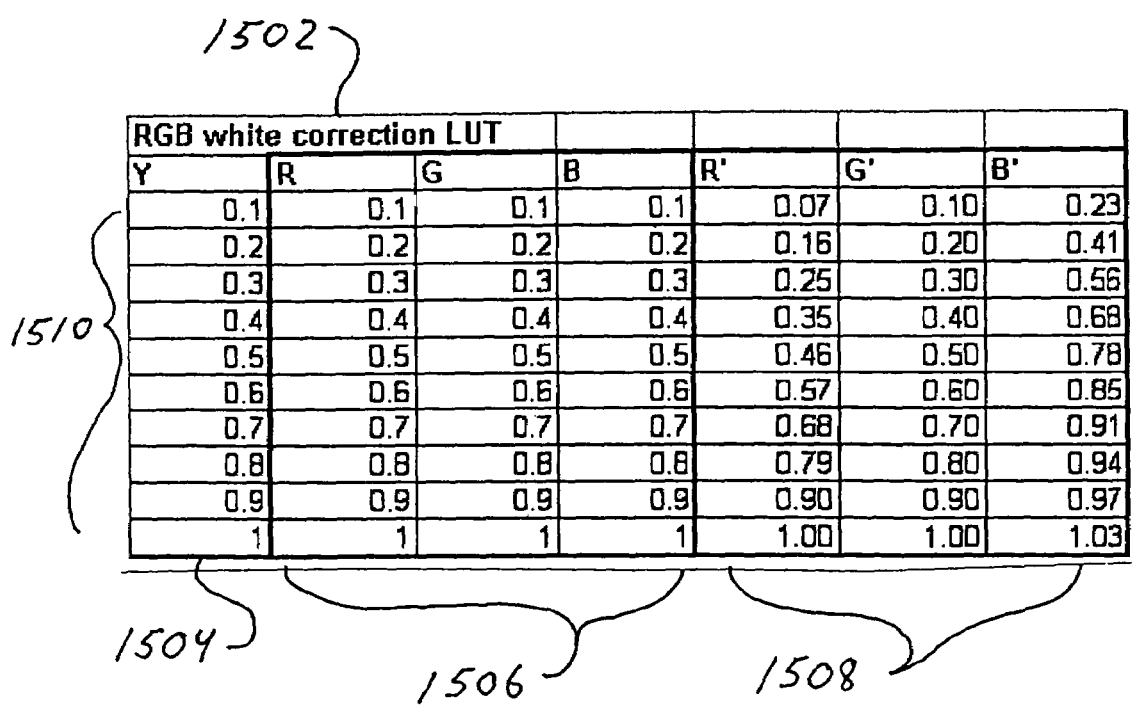

FIG. 15 illustrates correction of the white point of a color gamut, as a function of luminance level, according to one embodiment of the invention. With reference to FIG. 15, table 1502 contains a transformation of a white point of a color gamut for 10 different luminance levels listed at 1504. For a given row in table 1502, an RGB point is shown at 1506 and the corresponding transformed R"G"B" point is shown at 1508. The table 1502 can be generated at any increment in luminance; thereby, producing a general number of rows 1510.

The data displayed in table 1502 is plotted in a graph 1520. The horizontal axis 1522 of the graph 1520 is labeled "Nominal RGB values" and the vertical axis 1524 is labeled "Corrected RGB values," (which correspond to the R"G"B" values. The "Corrected RGB values" (from 1508) are plotted against the values from 1506. For the particular system represented by the lookup table of FIG. 15, it is observed that there is a relative increase in luminance for the blue (B') values 1530 and a relative decrease in the luminance for the red (R') values 1526. The corrected green (G') values 1528 are essentially equivalent to the nominal values 1532. In other embodiments, the lookup tables will be different and the relative trends will be different. The data presented in FIG. 15 is merely for illustrative purposes and does not limit the embodiments of the invention within this description.

Figure 16:
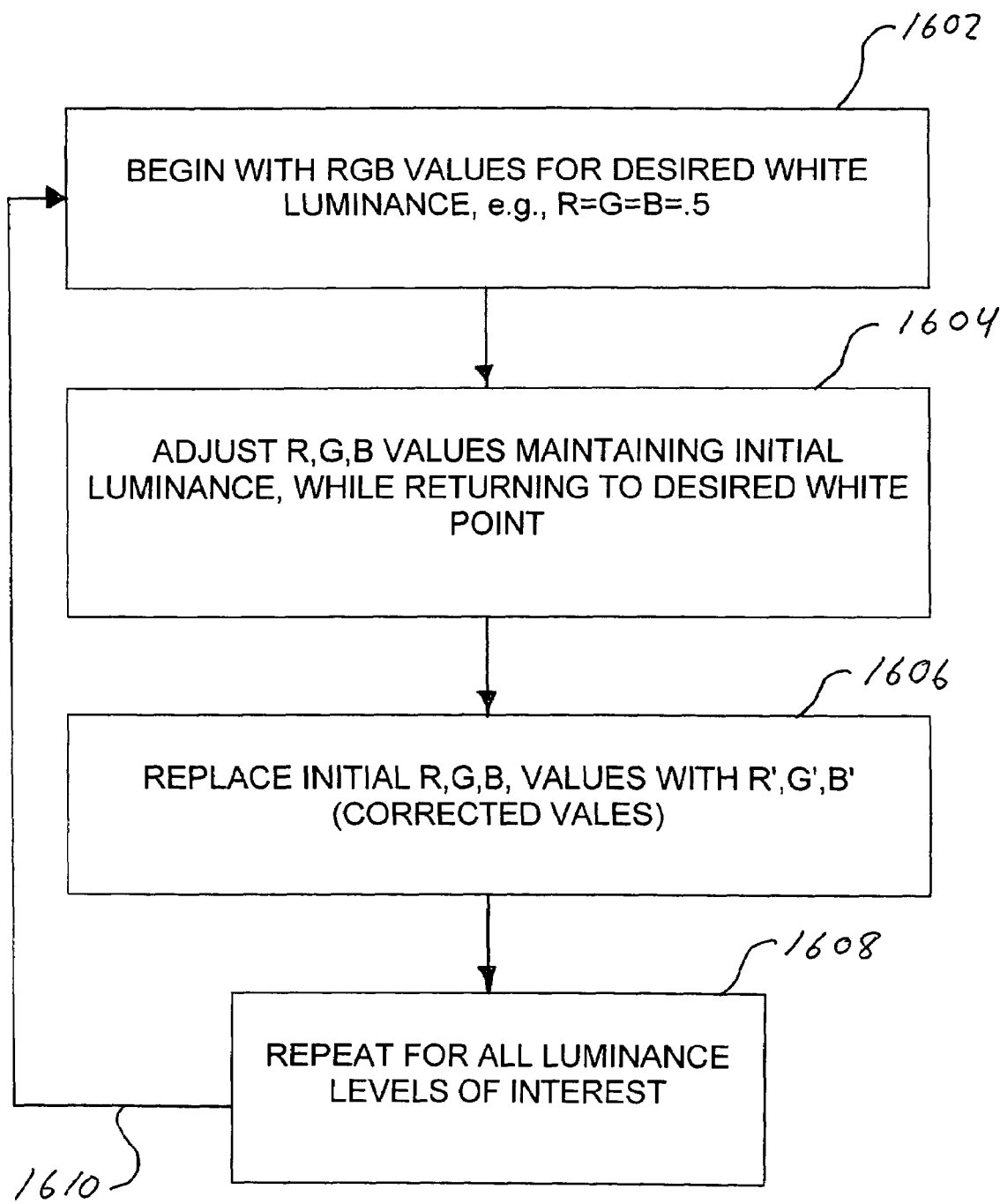
FIG. 16 is a block diagram for a technique used to generate the lookup table of FIG. 15, according to one embodiment of the invention.

Several additional techniques may be used with the technique described above in conjunction with FIG. 14. FIG. 16 is a block diagram for a technique used to generate the lookup table of FIG. 15, according to one embodiment of the invention. With reference to FIG. 16, an initial luminance point is set at block 1602, such as R=G=B=0.5.

The RGB values are corrected to the desired white point while maintaining the initial luminance at block 1604. In one embodiment, the white point is D6500. It will be recognized by those of skill in the art that other white points can be maintained, D6500 has been selected for illustration only. The technique implemented within block 1604 is described below in conjunction with FIG. 17. The technique executed in block 1604 determines R'G'B' values for 1508 (FIG. 15)

and builds the lookup table at block 1606. At block 1608 the process continues by incrementing the luminance values and proceeding to repeat 1610 the blocks again at 1602 with the incremented luminance values.

Figure 17:
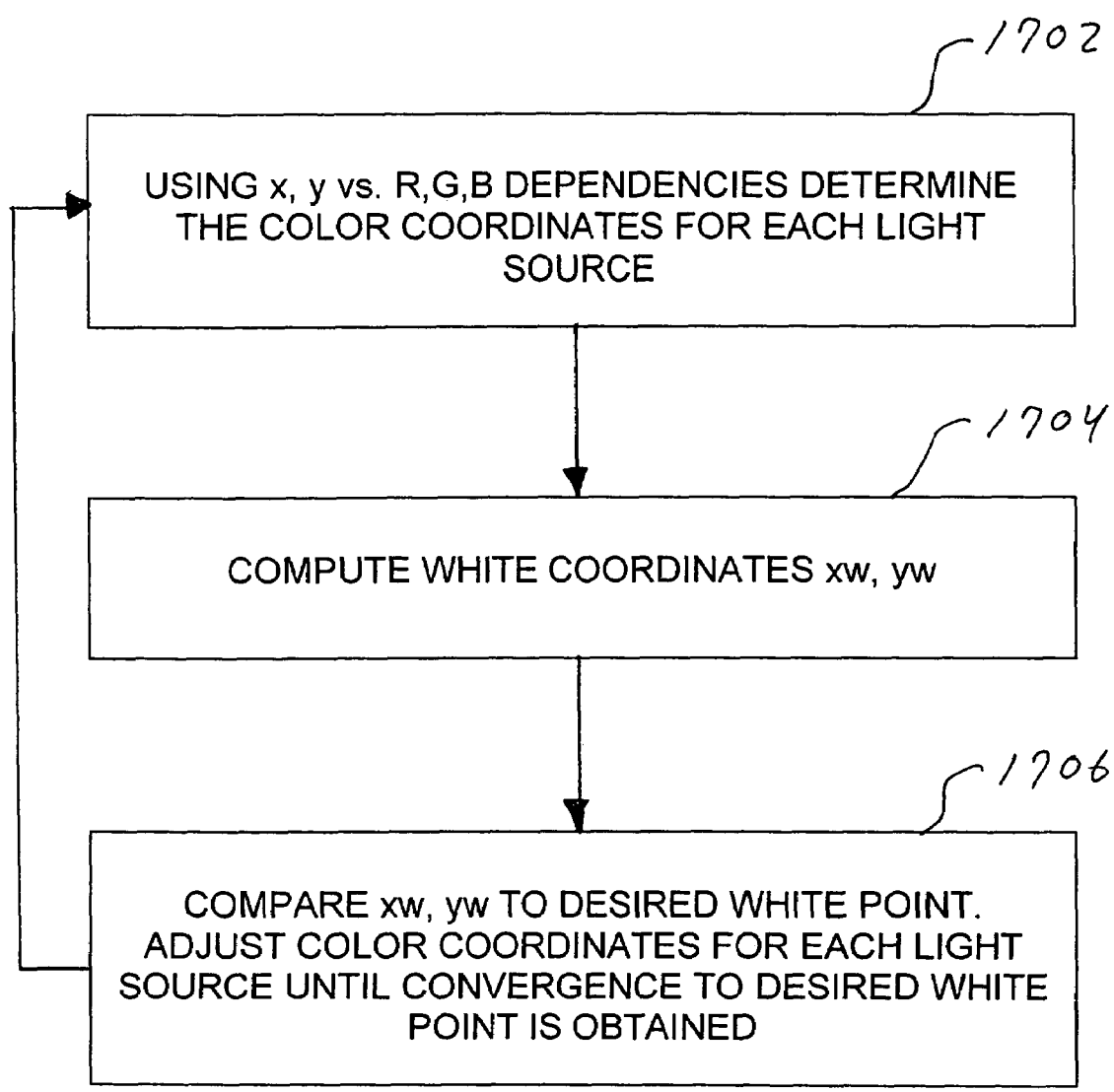
FIG. 17 illustrates correction of the white point of a color gamut at a fixed luminance level, according to one embodiment of the invention.

FIG. 17 illustrates correction of the white point of a color gamut at a fixed luminance level, according to one embodiment of the invention. Block 1604 (FIG. 16) represents the method depicted in FIG. 17. With reference to FIG. 17, the x, and y CIE chromaticity color coordinates are determined for each EELED 1702 as a function of luminance level, utilizing measurements of dominant wavelength and peak spectral intensity (as functions of EELED drive level). In the embodiment described, the red light source maintained a constant spectral output with drive level. In other embodiments, a red light source might exhibit non-idealities that would require correcting; the present invention is not limited to the embodiment presented in this description. At block 1704, the white point (coordinates) of the light sources at a given luminance value is computed using the algorithm described below in conjunction with FIG. 18. At block 1706, the white point calculated at block 1704 is compared to the desired white point. If the white point calculated at block 1704 is different from the desired white point, the method of FIG. 19 is called at block 1706 (FIG. 17) to adjust the RGB values until the desired white point has been achieved. When the desired white point has been achieved, the adjusted RGB values corresponding to the desired white point become the R'G'B' values 1508 of the lookup table 1502 (FIG. 15).

Figure 18:
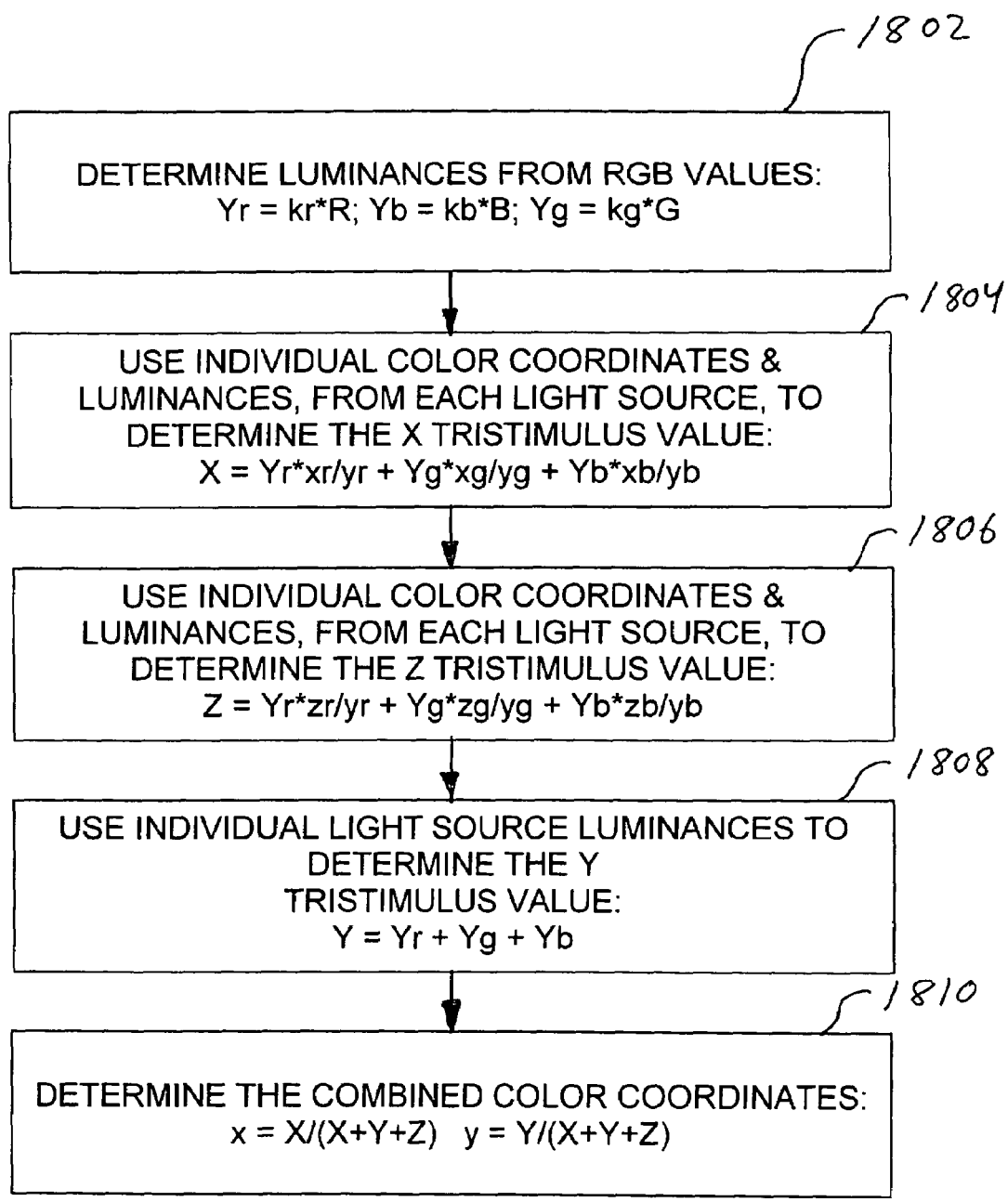
FIG. 18 illustrates a technique to generate Commission Internationale de l'Eclairage (CIE) chromaticity color coordinates from the system primaries, according to one embodiment of the invention.
Figure 19:
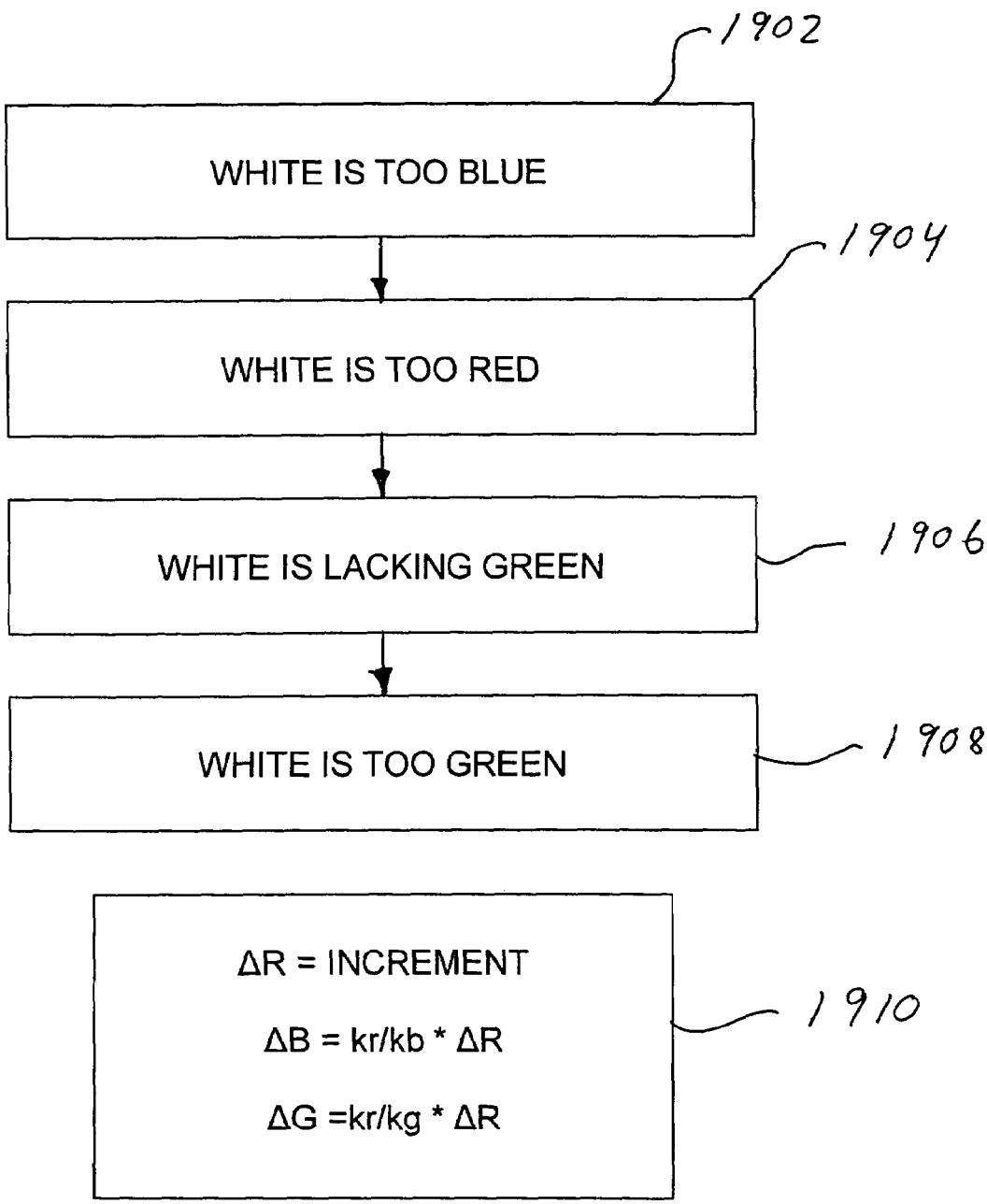
FIG. 19 illustrates a technique to adjust a corrected white point while maintaining constant luminance, according to one embodiment of the invention.

FIG. 18 illustrates an algorithm to generate CIE chromaticity colors from RGB values, according to one embodiment of the invention. With reference to FIG. 18, at block 1802 the luminances are calculated from the RGB values of the three light sources. At block 1804 the X tristimulus value is computed from the luminances and the x, y color coordinates for each light source, where xr, xg, and xb indicated the x chromaticity coordinate of the red, green, and blue light sources respectively. Similarly, yr, yg, and yb indicate the y chromaticity coordinate of the red, green, and blue light sources respectively. At block 1806 the Z tristimulus value is computed from the luminances and the x, y color coordinates for each light source. At block 1808 the Y tristimulus value is computed as the combined luminous from each of the light sources. At block 1810 the combined x, and y CIE color coordinates are determined from X, Y, and Z tristimulus values.

FIG. 19 illustrates a method to adjust a corrected white point while maintaining constant luminance, according to one embodiment of the invention. The method of FIG. 19 is called at block 1706 (FIG. 17) to adjust the RGB values until the desired white point has been achieved. With reference to FIG. 19 at block 1902, if the calculated white point (from FIG. 18) is too blue, R is incremented and B is decremented, while maintaining constant luminance. Such a condition is indicated when the x coordinate, of the white point, is less than the x coordinate, of the desired white point, such as 0.3127 in the case of D6500 white). An interval for incrementing and decrementing, ΔR, ΔG, and ΔB, and the relationships needed to maintain constant luminance, are indicated at 1910, where in one embodiment INCREMENT=0.0001.

At block 1904, if the calculated white point is too red, R is decremented and B is incremented, while maintaining constant luminance. Such a condition is indicated if the x coordinate, of the white point, is less than the x coordinate, of the desired white point, such as 0.3127 in the case of D6500 white.

At block 1906, if the calculated white point is lacking green, R is decremented and B is decremented, while maintaining constant luminance. Such a condition is indicated if the y coordinate, of the white point, is less than the y coordinate, of the desired white point, such as 0.3291 in the case of D6500 white.

At block 1908, if the calculated white point is too green, R is incremented and B is incremented, and G is decremented while maintaining constant luminance. Such a condition is indicated if the y coordinate, of the white, point is greater than the y coordinate, of the desired white point, such as 0.3291 in the case of D6500 white.

The methods and transformations described above in the preceding figures are representative of various embodiments of the invention. Other methods and transformations can be implemented to achieve correction of shifts in a dominant wavelength of one or more light sources used in displays and scanned beam devices. For example, in other embodiments, other color models can be used and other methods can be employed to compensate for the light source non-idealities.

In one or more embodiments, a gamma correction can be used to correct for various non-idealities of light sources, such as a shift in a dominant wavelength of a light source with modulation level. In one embodiment, the gamma correction is applied to a light emitting diode (LED) light source.

Figure 20:
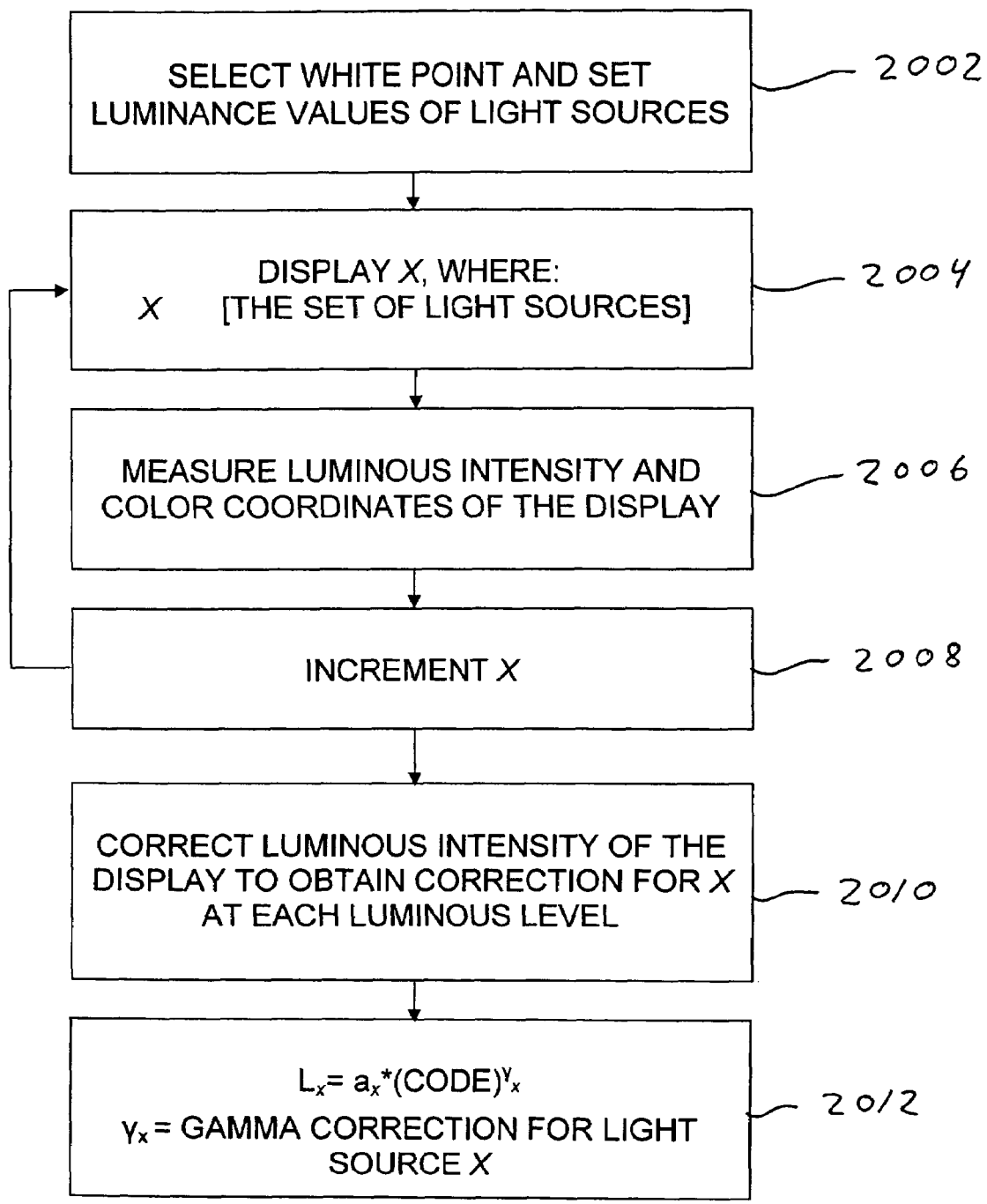
FIG. 20 illustrates a method to correct changes in a white balance of a display, according to one embodiment of the invention.

In one embodiment, FIG. 20 illustrates a method to correct changes in a white balance of a display, utilizing gamma correction. With reference to FIG. 20, the method begins at block 2002 where luminances for a set of light sources, used in the display, are set to maximum values and the desired white point is also set using the maximum luminance levels for the light sources. The processes described in blocks 2004, 2006, and 2008 are performed on each light source individually until all of the light sources have been tested. The process of FIG. 20 can be performed on polychromatic devices or on monochromatic devices, as well as light sources that can be directly modulated, such as light emitting diodes (LEDs) and on light sources that require external modulation.

At block 2004 a light source, indicated by X, is modulated across a range of luminances, typically the range of luminances will be the full range of luminances within the modulation range of the light sources. In one embodiment, three light sources are used; therefore, X will be taken from the set [R,G,B]. In one embodiment, the luminances for a set of light sources are referred to by device code, where device code ranges from 0, to 255.

At block 2006 the luminance intensity is measured across the range of luminance values. In one embodiment, the luminance intensity and the CIE color coordinates are measured with an Ocean Optics, Inc. S2000 Miniature Fiber Optic Spectrometer.

Figure 21:
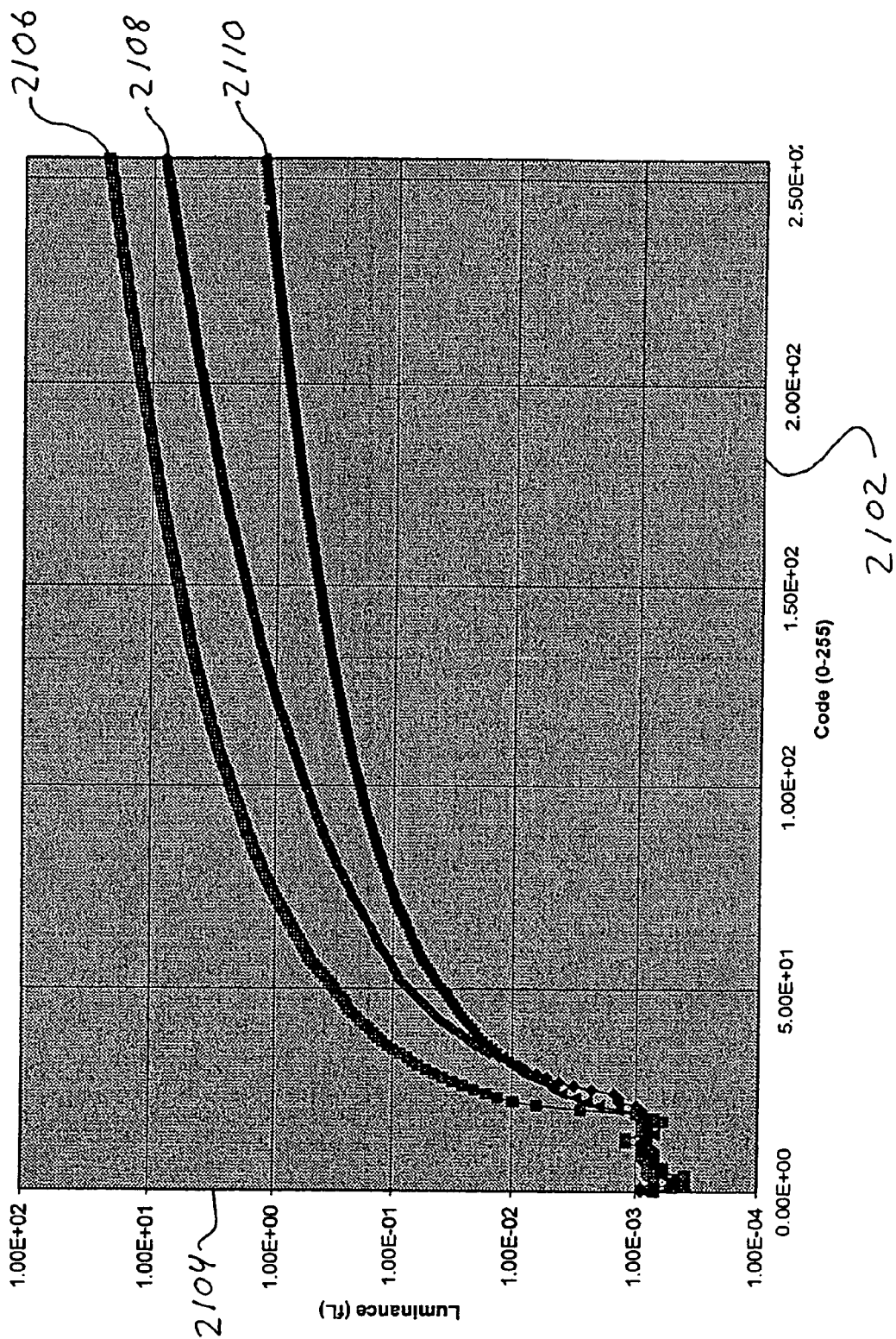
FIG. 21 shows individual RGB gamma corrections according to the method of FIG. 20, for one embodiment of the invention.

At block 2010 the luminance intensity is analyzed and the measured luminance intensity is corrected. In one embodiment, the correction for each light source is done with a look up table (LUT) where code maps onto itself. In the LUT, the old code is mapped to a new code such that the new code maps to an intensity that follows the gamma relation shown at block 2012. Knowing the desired gamma relation facilitates using a sort algorithm on the measured data or an inverse relation to find the corresponding code that gives the desired gamma relation. In one embodiment, separate gammas are chosen such that a color luminance ratio for each light source at a given code value maintains the white point selected in block 2002. This is possible, because the color coordinates were measured for the old code and can be used to predict the color coordinates of the new code. To determine if the correct color luminance ratios were chosen, a check is made by measuring the CIE color coordinates at intermediate code values with a spectrometer or color chromaticity meter. If the luminance ratio of the light sources is incorrect, an adjustment is made by selecting new gammas to maintain the white point selected in block 2002. Such a correction can, in some cases, result in the individual RGB gamma corrections crossing each other as shown in FIG. 21. As described above, the luminance intensity, $L_x$, follows the functional relationship shown at block 2012.

The corrections are used to correct the image data before the light sources are modulated. Following the method described above, separate gamma corrections are obtained for each light source in the display. Each gamma correction is a function of the modulation level of the light sources. In one or more embodiments, a modulation level is equivalent with a light source drive level. In various embodiments, the drive levels of LEDs are modulated to display image data on a display. Individual gamma corrections for each LED composing a display are incorporated into the display to correct the non-idealities that occur from drive level dependent shifts in the dominant wavelength of the LEDs.

FIG. 21 shows individual RGB gamma corrections, according to the method of FIG. 20, for one embodiment of the invention. With reference to FIG. 21, luminance intensity is plotted as a function of code value for three LED light sources in a display. The vertical axis 2104 corresponds to luminous intensity and the horizontal axis 2102 corresponds to code value. The gamma correction for the red LED is plotted as curve 2108. The gamma correction for the green LED is plotted as curve 2106 and the gamma correction for the blue LED is plotted as curve 2110.

The method of FIG. 20 has been applied, in one embodiment, to a series of LEDs in FIG. 21; however, the method can be applied to the modulation of an externally modulated device, such as a laser based device. Alternatively the method of FIG. 20 can be applied to various combinations of directly modulated light sources, such as LEDs, and externally modulated light sources, such as laser based light sources. In one or more embodiments, a device can include one or more directly modulated light sources and one or more externally modulated light sources.

Figure 22:
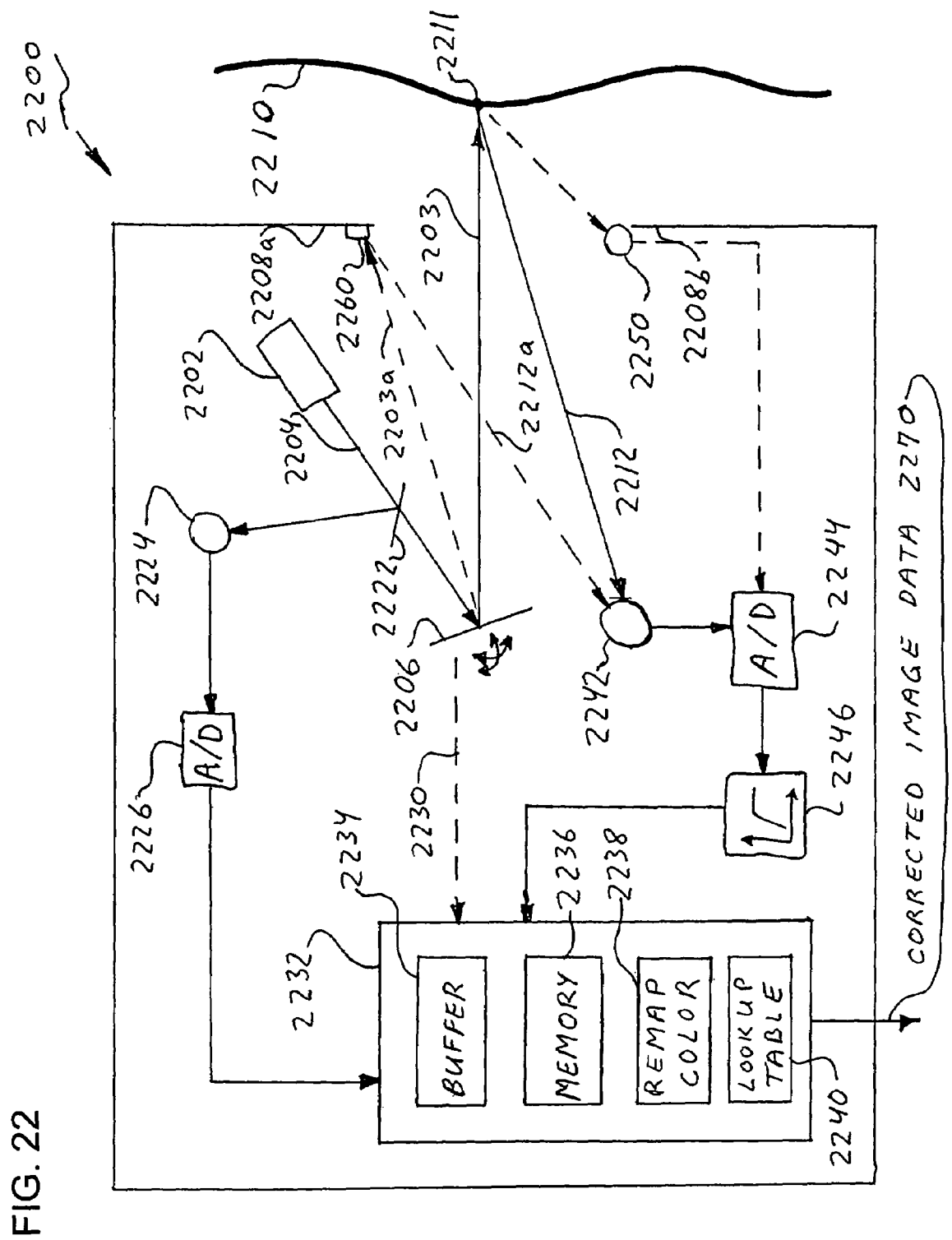
FIG. 22 illustrates correcting effects of spectral power distribution (SPD) variations, according to one embodiment of the invention.

FIG. 22 illustrates correcting effects of spectral power distribution (SPD) variations, according to one embodiment of the invention. With reference to FIG. 22, a device capable of capturing an image is shown generally at 2200. A light source 2202 creates a first beam of light 2204. A scanner 2206, which includes a mirror, deflects the first beam of light 2204 to produce a scanned beam 2203, the scanned beam 2203 passes through an aperture defined by surfaces 2208a and 2208b to illuminate a spot 2211 on a surface 2210. The scanner 2206 has been described above in the preceding figures.

While the scanned beam 2203 illuminates the spot 2211 the scanned beam 2203 is scattered from the surface 2210 at the spot 2211 to produce scattered light energy 2212. The scattered light energy 2212 is received by one or more detectors 2242 and is converted into a digital signal at analog to digital (A/D) converter 2244. Different types of detectors can be used for the detector 2242. In one embodiment, the detector 2242 is a positive-intrinsic-negative (PIN) photodiode. In the case of multi-colored imaging, the detector 2242 can include splitting and filtering functions to separate the scattered light into component parts before detection. Other detectors can be used, such as but not limited to, an avalanche photodiode, (APD) or a photomultiplier tube (PMT). In some embodiments, the detector 2242 collects light through filters (not shown) to reduce ambient light. In various embodiments, the detector(s) can be arranged to stare at the entire field of view (FOV), a portion of the FOV, collect light retrocollectively, or collect light confocally.

The output of the detector 2242 is received eventually at block 2232. Appropriate filtering can be applied to the signal at 2246. Optionally, a position of the scanner 2206, which corresponds to the location of the spot 2211, is communicated at 2230 to block 2232.

Information on the SPD of the light source 2202 is obtained, in one embodiment, with a device 2224. As described above, information on the SPD of a light source includes information on a dominant wavelength of the light source. Examples of such information include, but are not limited to, an integral of a SPD, a measure of a dominant wavelength, an increase in a dominant wavelength, a decrease in a dominant wavelength, etc. Such information, together with knowledge of an initial dominant wavelength of a light source is used to correct the scattered light energy 2212. A device 2222 diverts a portion of the first beam of light 2204 to the device 2224. In one embodiment, the device 2222 is a partially transmissive mirror. The device 2224 is described more fully below in conjunction with FIG. 23. The output of the device 2224 is eventually received at block 2232. The output of the device 2224 may be converted to a digital signal by A/D converter 2226.

In one embodiment, the scattered light energy 2212 is corrected by the information on the SPD of the light source 2202 to produce a corrected scattered-light-energy value corresponding to the light energy scattered from the spot 2211. The process is repeated for each spot on the surface 2210 corresponding to the collection of spots that compose the image of the surface 2210. Correction of the scattered light energy 2212 accounts for various non-idealities of the light source 2202, such as a time varying dominant wavelength of the SPD of the light source. In various embodiments, the correction can be applied to a picture element (pixel), a group of pixels, a line of an image, a frame of an image, etc. The present invention is not limited by the discretization applied to the image.

In one embodiment, a correction is applied to the scattered light energy 2212, which remaps the red, green, and blue (RGB) values of the picture element information (pixels) based on the measured SPD information, such as the actual dominant wavelength of the light source 2202, a shift in the dominant wavelength, etc. Remapping RGB values can be performed in one embodiment according to the method described above in conjunction with FIG. 14 through FIG. 19. The correction, in various embodiments, is performed by processing or manipulating the data representing the scattered light energy 2212. As will be recognized by those of skill in the art, such processing can be performed in the block 2232 by software or hardware or a combination of both.

In one embodiment, block 2232 contains a buffer 2234. The buffer 2234 receives data representing the scattered light energy 2212, the measured SPD information, and optionally the position 2230 of the scanner 2206. Block 2232 can include memory 2236, which can store one or more frames of image data. The lookup table 2240 can be used to perform the remapping 2238 of the RGB values, described above, resulting in corrected image data 2270.

In one embodiment, the functions of the device 2224 can be performed by a device 2260 and the detector 2242. In this embodiment, the scanned beam 2203a illuminates the device 2260 in an overscan region that is not in a field of view (FOV) (the FOV is a region where scattering from a surface is being measured). Generally, the device 2260 can be located anywhere along the optical path that is free of unquantified scattering sources. In one embodiment, the device 2260 can be located on the surface 2210. A scattered beam 2212a can be received by a detector 2242; thereby, obtaining information of the spectral power distribution of the light source 2202.

According to various embodiments, the image capture device 2200 can be used in a variety of applications, such as but not limited to, a digital camera, a bar code reader, multidimensional symbol reader, document scanner, or other image capture or acquisition device. To allow the device to gather light efficiently, the device 2200 can include gathering optics (not shown) that collect and transmit light from the surface 2210 to the device 2200. The gathering optics are configured to have a depth of field, a focal length, a field of view (FOV), and other optical characteristics appropriate for the particular application. For example, in one embodiment, where the device 2200 is a two-dimensional symbology reader, the gathering optics may be optimized for red or infrared light and the focal length may be on the order of 10-50 centimeters. For reading symbols at a greater distance, the focusing optics may have a longer focusing distance or may have a variable focus. The optics may be positioned at various locations along the optical path to allow smaller, cheaper components to be used.

Figure 23:
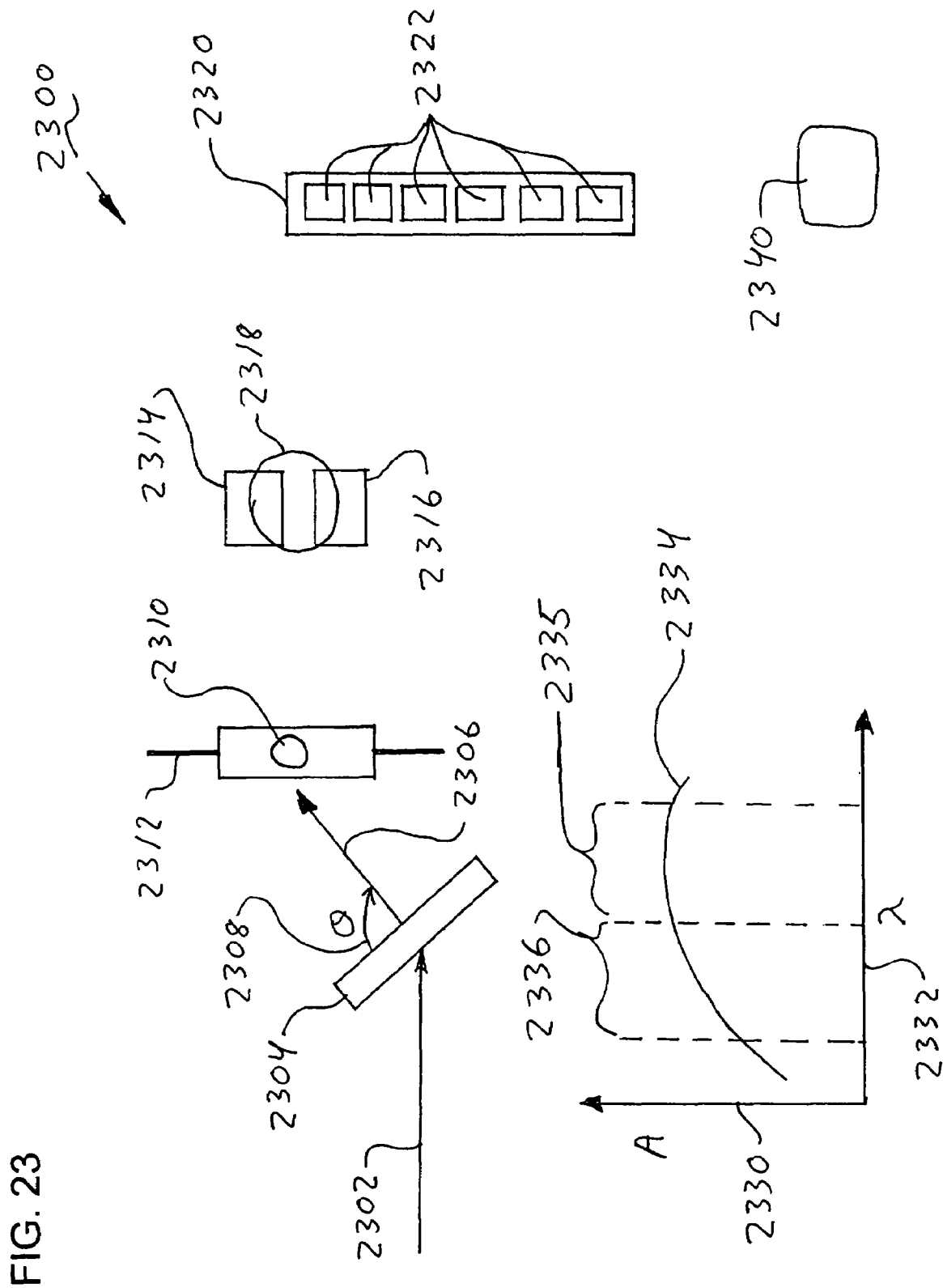
FIG. 23 illustrates various devices used to obtain information on the spectral power distribution (SPD) of a light source, according to embodiments of the invention.

FIG. 23 illustrates various devices 2300, used to obtain information on the spectral power distribution (SPD) of a light source, according to embodiments of the invention. With reference to FIG. 23, in one embodiment, a diffractive optical element 2304 is in a path of an optical beam 2302. The angle 2308 will be a function of the dominant wavelength of the optical beam 2302. A detector arranged to sense the angle 2308 or changes in the angle 2308 will provide information on the dominant wavelength of the optical beam. In one embodiment, the diffractive optical element 2304 can direct the beam 2306 to a photo-resistor 2310 that is part of an arm 2312 of a Wheatstone bridge. Variations in the output of the photo-resistor 2310 can be related to the dominant wavelength of the optical beam through the diffraction angle 2308.

In another embodiment, a first photodetector 2314 and a second photodetector 2316 are positioned to be illuminated by an optical beam 2318. The relative output of the photodetectors is calibrated to dominant wavelength shift in the optical beam 2302; thereby, obtaining information on the dominant wavelength of the optical beam 2302. In another embodiment, an array of photodetectors 2320 contains photodetectors 2322. The optical beam 2306 illuminates the array 2320. The array 2320 is used in various configurations to provide a measure of the dominant wavelength within the optical beam by calibrating the output of the array 2320 to the dominant wavelength of the optical beam.

In one embodiment a response curve of a photodetector is shown at 2334, where the vertical axis 2330 corresponds to amplitude out of the detector and the horizontal axis 2332 corresponds to wavelength of the optical energy incident upon the detector. Typically, photodetectors exhibit a response that has a less sloped portion, indicated at 2335 and a sloped portion indicated at, for example, a measurement range 2336. The optical beam 2302 can be illuminated directly on a photodetector selected to have its sloped response 2336 in the range of dominant wavelengths of interest. Such a configuration does not require the diffractive element 2304. The output of a photodetector so configured can be calibrated to the dominant wavelength of the optical beam incident thereon.

In one embodiment, a detector is configured to place a first photodetector 2314 and a second photodetector 2316 in the path of an optical beam. The pair of photodetectors is used to measure both the amplitude of the energy in the optical beam and the dominant wavelength of the optical beam. In one configuration, the first photodetector 2314 is selected to place a portion of its response 2335 within a range of dominant wavelengths appropriate for the optical beam. The second photodetector 2316 is selected to place its sloped response 2336 within the same range of dominant wavelengths. Such a pair of photodetectors, so selected, provides a measure of both the amplitude and the dominant wavelength of the light source used to create the optical beam. The measure of the amplitude (made with the first photodetector) can be used to correct non-idealities in the amplitude of the light source and the measure of the dominant wavelength (made with the second photodetector) can be used to correct non-idealities in the dominant wavelength of the light source. In this dual photodetector configuration a diffractive element is not required.

In another embodiment, an object 2340 having a known spectral reflectance is placed in the optical path to obtain a scattered signal (received by a detector) that provides information on the spectral power distribution of the light source. In one embodiment, such an object 2340 is a white spot. An optical beam, which can be the output of a colored light source, is reflected from the white spot and the reflected signal is processed knowing the reflectance of the white spot to determine dominant wavelength of the light source.

In various embodiments, the object 2340 having a known spectral reflectance can be colored paint or colored ink, a wavelength selective reflector, stacked reflectors, such as stacked quarter-wave reflectors, a certain material like a metal, etc. The object 2340 can be any object with a known spectral reflectance, the present invention is not limited by the object 2340 used to obtain the known scattered energy. Alternatively, a spectrometer could be used to obtain information on the spectral power distribution of the light source.

The devices described above in conjunction with FIG. 23 can be used in the description of the systems herein, used to capture and to display images, such as detector 2242, detector 2250, device 2260, device 2224 (FIG. 22), etc. and other figures above.

Another non-ideality that exists in a system used to capture or display an image is the use of a light source that creates a non-ideal color gamut. In such a case, it is desirable to transform the color gamut resulting from the actual colors of the light source to another color gamut.

For example, referring back to FIG. 13, a first color gamut defined by the triangular region prescribed by points 1308, 1314, and 1316 represents, in one embodiment, the actual color gamut of a system. A second color gamut defined by the triangular region prescribed by points 1308, 1310, and 1312 represents, in one embodiment, the preferred color gamut of the system. However, the system is operated with light sources that produce colors in the first color gamut. To obtain colors from the system in the second color gamut a transformation is made between the first color gamut and the second color gamut. For the purpose of this description the CIE color system has been used to describe a color gamut, embodiments of the present invention are not so limited; other constructs can be used to describe color, such as the other references mentioned herein. In one embodiment, a dominant wavelength of a blue light source used in a system to produce the first color gamut is in the range 405-410 nanometers and conforms to the Blue-ray Disk specification and the second color gamut is based on a blue light wavelength in range of 450-460 nanometers.

For purposes of discussing and understanding the embodiments of the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

An apparatus for performing the operations herein can implement the present invention. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk-read only memories (CD-ROMs), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of media suitable for storing electronic instructions either local to the computer or remote to the computer.

The algorithms and displays presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of ordinary skill in the art will immediately appreciate that the invention can be practiced with computer system configurations other than those described, including hand-held devices, multiprocessor systems, microprocessor-based or programmable consumer electronics, digital signal processing (DSP) devices, set top boxes, network PCs, minicomputers, mainframe computers, and the like. The invention can also be practiced in distributed computing environments where tasks are performed by remote processing devices that are linked through a communications network.

The methods herein may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

While the invention has been described in terms of several embodiments, those of skill in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
obtaining a measurement of a property of a light source, the light source emitting light that is used in a scanned beam device;
scanning light from the light source onto a surface, wherein the light interacts with the surface;
detecting light from the surface to create a picture element; and
controlling an output of the light source as a function of the measurement, wherein the controlling removes the effect of a variation of the property on a picture element created with the scanned beam device.

2. The method of claim 1, wherein the property is an intensity of the light source, the measurement occurs before the scanning and the correcting uses the measurement to normalize an intensity of the picture element.

3. The method of claim 1, wherein the picture element is a pixel, a group of pixels or a frame of pixels.

4. The method of claim 1, wherein the property is a wavelength spectrum, a power spectral density or a dominant wavelength.

5. The method of claim 4, wherein the scanning provides a set of system primaries associated with the picture element and the measurement is used by the correcting to modify a color of the picture element.

6. The method of claim 5, wherein the system primaries are red, blue, and green (RGB).

7. The method of claim 5, wherein the correcting utilizes a lookup table.

8. The method of claim 1, wherein the light source is a light emitting diode, an edge emitting light emitting diode, a laser diode, a diode pumped solid state laser or a laser.

9. The method of claim 1, wherein the light source conforms substantially to the Blue-Ray standard.

10. The method of claim 1, wherein the light source is an Indium gallium Nitride/gallium nitride (InGaN/GaN) light emitting diode or an InGaN/GaN edge emitting light emitting diode.

11. A method comprising:
receiving an input signal, the input signal contains picture element information;
obtaining a measurement of a property of a light source, the light source emitting light that is used in a scanned beam device that creates an image from the picture element information; and
correcting the input signal to provide an output signal, wherein correcting the input signal comprises controlling the input signal such that an output of the light source is a function of the measurement, wherein the correcting removes the effect of a variation of the property on the picture element created with the scanned beam device.

12. The method of claim 11, wherein the input signal contains intensity and hue information for a picture element and the correcting transforms the hue information while maintaining substantially constant intensity, such that the effect of the predetermined characteristic on the output signal is substantially eliminated from the image.

13. The method of claim 11, wherein the correcting utilizes a lookup table.

14. The method of claim 13, wherein the lookup table associates input signal system primary information with transformed output signal system primary information, such that the effect of the predetermined characteristic is substantially removed from the image.

15. The method of claim 14, wherein the input signal system primary information is red, blue, green (RGB) or cyan black, yellow, magenta (CMYK).

16. The method of claim 11, wherein the light source is a light emitting diode, an edge emitting light emitting diode, a laser diode, a diode pumped solid state laser or a laser.

17. The method of claim 11, wherein the light source conforms to the Blue-ray Disc standard.

18. The method of claim 11, wherein the light source is an Indium gallium Nitride/gallium nitride (InGaN/GaN) light emitting diode or an InGaN/GaN edge emitting light emitting diode.

19. The method of claim 11, wherein the predetermined characteristic is a shift in wavelength spectra of the light source with drive level.

20. The method of claim 11, wherein the predetermined characteristic is a shift in intensity or a shift in a wavelength spectrum.

21. The method of claim 11, wherein the scanned beam device is used in an image device and the image device is a head mounted display, a display, a digital video camera, a film camera or a camera.

22. A method comprising:
obtaining a measurement of a property of a light source, the light source emits light that is used in a scanned beam device; and
controlling an output of the light source as a function of the measurement, wherein the controlling removes the effect of a variation of the property on a picture element created with the scanned beam device.

23. The method of claim 22, wherein the scanned beam device scans a beam of light, emitted from the light source, onto a surface to capture an image of the surface.

24. The method of claim 22, wherein the scanned beam device is a scanned beam display.

25. The method of claim 22, wherein the picture element is a group of pixels, a frame of pixels or a group of frames of pixels.

26. The method of claim 22, wherein the light source is a light emitting diode, an edge emitting light emitting diode, a laser diode, a diode pumped solid state laser or a laser.

27. The method of claim 22, wherein the light source conforms to the Blue-ray Disc standard.

28. The method of claim 22, wherein the property includes luminance.

29. The method of claim 22, wherein the property includes spectral power distribution.

30. A method comprising:
sampling an output of a light source;
analyzing the output to identify a noise component;

scanning a surface with light emitted from the light source to create picture elements;

removing the noise component from the picture elements; and wherein the light source conforms to the Blue-ray Disc standard.

31. The method of claim 30, wherein the analyzing tracks the output of the light source to identify the noise component.

32. The method of claim 31 wherein the system primaries are red, blue, and green (RGB).

33. The method of claim 30, wherein the removing utilizes a lookup table to remove noise components from the picture elements.

34. The method of claim 30, wherein the light source is a light emitting diode, an edge emitting light emitting diode, a laser diode, a diode pumped solid state laser or a laser.

35. The method of claim 30, wherein analyzing includes correlation of picture elements to a surface location.

36. A method comprising:

driving a light source in a scanning beam device wherein picture element information is processed in a first region;

providing a reference signal to the light source in a second region;

measuring a parameter of the light source while the reference signal is provided to the light source; and adjusting the light source in the first region as a function of the parameter.

37. The method of claim 36, wherein the reference signal is a current.

38. The method of claim 36, wherein the parameter is a voltage.

39. The method of claim 36, wherein the scanning beam device is scanning beam display.

40. The method of claim 39, wherein the second region is not part of the image presented to a user.

41. The method of claim 36, wherein the scanning beam device scans a surface to capture an image.

42. An apparatus comprising:

a scanned beam device having a light source, the scanned beam device being operable to produce an image according to a signal, the signal containing picture element information, the picture element information including information for a plurality of colors, wherein information for at least one color is corrected to remove a perturbation to the picture element information such that an image containing the picture element information is substantially unchanged by the perturbation.

43. The apparatus of claim 42, further comprising:

a scanned beam display, the scanned beam display is configured to receive the signal and to scan the signal for viewing by a user.

44. The apparatus of claim 43, further including:

a camera, wherein the scanned beam display provides a view of an image received by the camera to the user.

45. The apparatus of claim 44, wherein the scanned beam display provides the view by scanning the image onto a retina of the user's eye.

46. The apparatus of claim 44, wherein the scanned beam display provides the view by scanning the image onto a surface.

47. The apparatus of claim 44, wherein the camera is a digital camera, a film camera or a digital video camera.

48. The apparatus of claim 42, wherein the perturbation is a change in the light source intensity or a change in the light source wavelength spectrum.

49. The apparatus of claim 42, wherein the light source is a light emitting diode, an edge emitting light emitting diode, a laser diode, a diode pumped solid state laser or a laser.

50. The apparatus of claim 42, wherein the light source conforms substantially to the Blue-ray Disc standard.

51. The apparatus of claim 42, wherein the light source is an Indium gallium Nitride/gallium nitride (InGaN/GaN) light emitting diode or an InGaN/GaN edge emitting light emitting diode.

52. An apparatus comprising:

a scanned beam display, the scanned beam display configured to receive a signal and to scan the signal onto a viewing surface for viewing by a user, wherein the signal is to contain picture element information, the picture element information includes information for a plurality of colors, wherein information for at least one color is corrected to substantially remove a perturbation to the picture element information, such that an image containing the picture element information will be substantially unchanged by the perturbation.

53. The apparatus of claim 52, further comprising:

a scanned beam display, the scanned beam display is configured to receive the signal and to scan the signal for viewing by a user.

54. The apparatus of claim 53, further including:

a camera, wherein the scanned beam display provides a view of an image received by the camera to the user.

55. The apparatus of claim 54, wherein the scanned beam display provides the view by scanning the image onto a retina of the user's eye.

56. The apparatus of claim 54, wherein the scanned beam display provides the view by scanning the image onto a surface.

57. The apparatus of claim 54, wherein the camera is a digital camera, a film camera or a digital video camera.

58. The apparatus of claim 52, wherein the perturbation is a change in the light source intensity or a change in the light source wavelength spectrum.

59. The apparatus of claim 52, wherein the light source is a light emitting diode, an edge emitting light emitting diode, a laser diode, a diode pumped solid state laser or a laser.

60. The apparatus of claim 52, wherein the light source conforms substantially to the Blue-ray Disc standard.

61. The apparatus of claim 52, wherein the light source is an Indium gallium Nitride/gallium nitride (InGaN/GaN) light emitting diode or an InGaN/GaN edge emitting light emitting diode.

62. An apparatus comprising:

a light source substantially conforming to the Blue-ray Disk Standard; and a correction device, the correction device in communication with the light source and in communication with picture element information, wherein the correction device controls the light source as a function of the picture element information.

63. The apparatus of claim 62, wherein the correction device utilizes a lookup table to correct the picture element information that is to be communicated to the light source.

64. The apparatus of claim 62, wherein the light source is a light emitting diode, an edge emitting light emitting diode, a laser diode, a diode pumped solid state laser or a laser.

65. An apparatus comprising:

means for receiving a signal, the signal containing picture element information;

means for correcting an attribute of the picture element information;

means for scanning a beam of light, wherein the beam of light is adjusted as a function of the correcting and the scanning creates an image; and wherein the beam of light is created with a light source that conforms substantially to the Blue-ray Disk standard.

66. The apparatus of claim 65, wherein the beam of light is created with a light source and the light source is a light emitting diode, an edge emitting light emitting diode, a laser diode, a diode pumped solid state laser or a laser.

67. The apparatus of claim 65, wherein the beam of light is created with a light source and the light source is an Indium gallium Nitride/gallium nitride (InGaN/GaN) light emitting diode or an InGaN/GaN edge emitting light emitting diode.

68. The apparatus of claim 65, further comprising:

means for storing the image.

* * * * *